(12) United States Patent
Kothary

(10) Patent No.: US 6,249,528 B1
(45) Date of Patent: Jun. 19, 2001

(54) NETWORK SWITCH PROVIDING PER VIRTUAL CHANNEL QUEUING FOR SEGMENTATION AND REASSEMBLY

(75) Inventor: Piyush Kothary, San Jose, CA (US)

(73) Assignee: I-Cube, Inc., Campbell, CA (US)

(*) Notice: Subject to any disclaimer, the term of this patent is extended or adjusted under 35 U.S.C. 154(b) by 0 days.

(21) Appl. No.: 09/041,826

(22) Filed: Mar. 12, 1998

(51) Int. Cl.[7] .................................................. H04J 3/16
(52) U.S. Cl. ........................ 370/466; 370/395; 370/474
(58) Field of Search .................................. 370/395, 465, 370/466, 412, 428, 474

(56) References Cited

U.S. PATENT DOCUMENTS 5,805,805 * 9/1998 Civanlar et al. ..................... 370/409
6,052,383 * 4/2000 Stoner et al. ........................ 370/466

* cited by examiner

Primary Examiner—Wellington Chin
Assistant Examiner—Maikhanh Tran

(74) Attorney, Agent, or Firm—Daniel J. Bedell; Smith-Hill and Bedell

(57) ABSTRACT

A network routing switch includes a crosspoint switch, a set of Ethernet I/O ports, a set of ATM I/O ports, a reassembly unit for converting ATM transmissions into Ethernet transmissions, and a segmentation unit for converting Ethernet transmissions into ATM transmissions. As an ATM I/O port receives cells of an ATM transmission from an external source it stores them until the transmission is complete and then sends the ATM transmission through the crosspoint switch either to a forwarding ATM port or to the reassembly unit depending on whether the ATM transmission is to be forwarded as an ATM or Ethernet transmission. When the reassembly unit receives an ATM transmission it converts it to an Ethernet transmission and forwards it through the crosspoint switch to a forwarding Ethernet I/O port. When an Ethernet I/O port receives an Ethernet packet from an external source, it sends the packet through the crosspoint switch either to a forwarding Ethernet port or to the segmentation unit, depending on whether the Ethernet packet is to be forwarded as an Ethernet or ATM transmission. When the segmentation unit receives an Ethernet packet it converts it to an ATM transmission and forwards it through the crosspoint switch to a forwarding ATM I/O port.

21 Claims, 9 Drawing Sheets

NETWORK SWITCH PROVIDING PER VIRTUAL CHANNEL QUEUING FOR SEGMENTATION AND REASSEMBLY

BACKGROUND OF THE INVENTION

1. Field of the Invention

The present invention relates in general to a network routing switch for routing both ATM and Ethernet protocol data transmissions between stations of a computer network, and in particular to a routing switch that translates between the two protocols.

2. Description of Related Art

Ethernet and asynchronous transfer mode (ATM) protocols are widely used to convey data between network stations. A station in an Ethernet network sends data to other stations in the form of a variable length Ethernet packet including, in addition to a payload of 46 to 1500 bytes of data, fields indicating its network source and destination addresses and other information. An Ethernet packet must be sent and received as a continuous transmission and cannot be interleaved with other transmissions.

A station in an ATM network segments a data transmission into a variable number of 48-bit ATM cells. Each ATM cell includes a fixed length data payload, a virtual path identifier (VPI), a virtual channel identifier (VCI) and other information. All ATM cells forming an ATM transmission have the same VCI and VPI identifiers. The VPI field identifies a particular virtual path that the cells of the transmission are to follow through the network. Each virtual path may have several virtual channels. The VCI field identifies the particular virtual channel within a virtual path to which a transmission is assigned. When two ATM transmissions are assigned to the same virtual channel of the same virtual path, one transmission must follow the other; their cells may not be interleaved. An end of message (EOM) code included in the last cell of each transmission marks the boundary between that transmission and the next transmission of the same virtual path and channel. Cells of several ATM transmissions assigned to the same virtual path may be interleaved on the same physical transmission line at any point along that path provided they are assigned to different virtual channels. The VPI field in the cells allows a receiving network device to sort them by transmission.

In one respect Ethernet packets are more efficient than ATM transmissions because an Ethernet packet can contain more payload data per unit of routing information than an ATM cell. However in networks where stations must compete for high speed transmission channels, the ability to interleaved ATM cells allows more efficient use of data transmission bandwidth.

It is sometimes advantageous for a network to employ both ATM and Ethernet protocols. For example a small cluster of closely associated network stations interconnected by a network routing switch may communicate with one another via Ethernet protocol. However when routing switches interconnecting such clusters of network stations are themselves interconnected by high speed channels, it may be advantageous to employ ATM protocol when sending data over those high speed channels. In such systems "segmentation" and "reassembly" units are used to convert between Ethernet and ATM transmission protocols. A segmentation unit segments a large Ethernet packet into a sequence of smaller ATM cells. A reassembly unit "reassembles" a transmission of small ATM cells into one or more large Ethernet packets.

Prior art routing switches handle only one transmission protocol. Thus, for example, when a network switch uses Ethernet protocol, a reassembly unit must convert each ATM transmission to Ethernet protocol before the transmission arrives at the switch. Conversely a segmentation unit must convert an Ethernet packet emerging from the switch to ATM protocol before it can be forwarded via a high speed ATM channel. Thus segmentation and reassembly units are required at each Ethernet switch port that is to communicate via ATM protocol.

A segmentation unit is relatively simple and requires relatively little storage capacity because it need only process one Ethernet packet at a time. However since cells of many (perhaps hundreds) of different ATM transmissions may arrive at a reassembly unit interleaved, a reassembly unit requires much logic and memory to sort out the interleaved ATM transmissions and to store the cells of each ATM transmission until they can be assembled into an Ethernet packet. Thus each reassembly unit requires access to a large memory for storing ATM cells of large numbers of data transmissions and also needs complicated logic for keeping track of the ATM transmissions that it is storing. Due to the complicated nature of the reassembly unit and its need for a large, external memory, a segmentation/reassembly unit capable of handling high speed data traffic is physically large and requires numerous I/O pins. Since such a segmentation/reassembly unit may be needed for each of several switch ports, a network switch capable of ATM/Ethernet translation is large and expensive.

Also since the routing switch operates only in one protocol, an ATM packet destined for an ATM system must first be translated into Ethernet protocol, sent through the Ethernet protocol routing switch, and then converted back into ATM protocol. The double translation of ATM packets simply to move them through an Ethernet protocol switch reduces system throughput.

What is needed is a network switch that routes both ATM and Ethernet protocol transmissions, that provides segmentation and reassembly only when necessary, and which does not employ a large number of complicated segmentation/reassembly units.

SUMMARY OF THE INVENTION

A network routing switch in accordance with the present invention includes a crosspoint switch, a set of Ethernet I/O ports, a set of ATM I/O ports, a reassembly unit for converting ATM transmissions into Ethernet transmissions, and a segmentation unit for converting Ethernet transmissions into ATM transmissions. As an ATM I/O port receives cells of an ATM transmission from an external source it stores them until the transmission is complete and then sends the ATM transmission through the crosspoint switch either to a forwarding ATM port or to the reassembly unit depending on whether the ATM transmission is to be forwarded as an ATM or Ethernet transmission. When the reassembly unit receives an ATM transmission it converts it to an Ethernet transmission and forwards it through the crosspoint switch to a forwarding Ethernet I/O port. When an Ethernet I/O port receives an Ethernet packet from an external source it sends the packet through the crosspoint switch either to a forwarding Ethernet port or to the segmentation unit depending on whether the Ethernet packet is to be forwarded as an Ethernet or ATM transmission. When the segmentation unit receives an Ethernet packet it converts it to an ATM transmission and forwards it through the crosspoint switch to a forwarding ATM I/O port.

It is accordingly an object of the invention to provide a network switch that can route both ATM and Ethernet packets and which translates between ATM and Ethernet protocols only when necessary.

It is another object of the invention to provide a network switch that can translate between ATM and Ethernet packets using only a single segmentation unit and a single reassembly unit, rather than a segmentation and reassembly unit at each of several I/O ports.

The concluding portion of this specification particularly points out and distinctly claims the subject matter of the present invention. However those skilled in the art will best understand both the organization and method of operation of the invention, together with further advantages and objects thereof, by reading the remaining portions of the specification in view of the accompanying drawing(s) wherein like reference characters refer to like elements.

BRIEF DESCRIPTION OF THE DRAWING(S)

DESCRIPTION OF THE PREFERRED EMBODIMENT(S)

Figure 1:
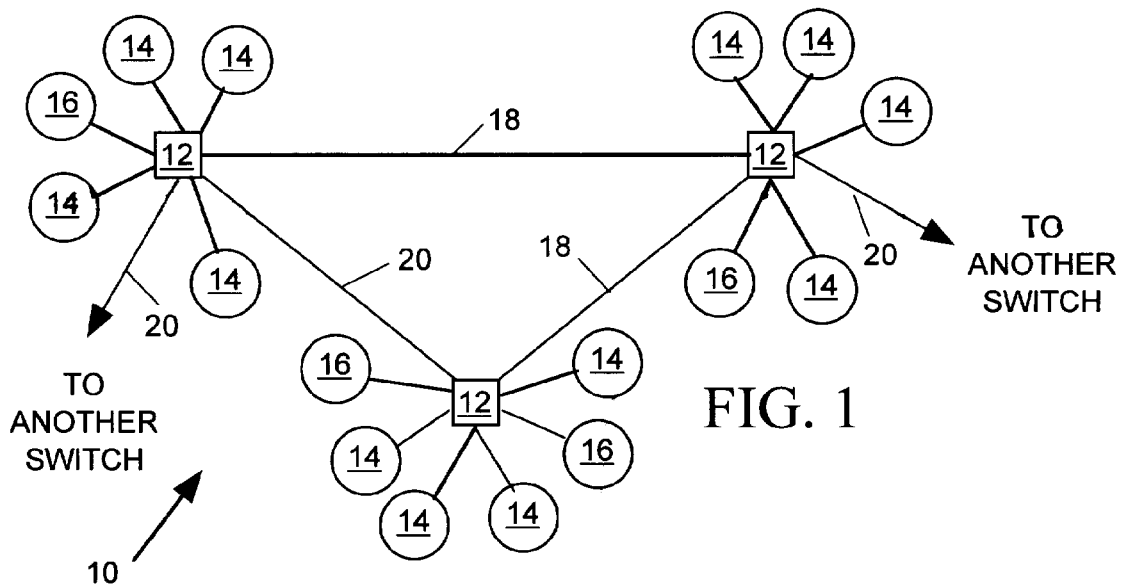
FIG. 1 illustrates a computer network employing a set of network routing switches in accordance with the present invention.

FIG. 1 illustrates a computer network 10 employing a set of network routing switches 12 in accordance with the present invention. Switches 12 interconnect network stations 14 employing Ethernet protocol and networks stations 16 employing ATM protocol and provide the protocol translation when necessary to allow stations 14 and 16 to communicate with each other. Routing switches 12 are themselves linked either by high speed Ethernet communication paths 18 or ATM communication paths 20.

When an Ethernet station 14 transmits an Ethernet packet to a switch 12, the switch determines from routing data included in the transmission whether it must forward the transmission to a local Ethernet station 14, a local ATM station 16, or to another switch 12 via an Ethernet path 18 or an ATM path 20. If the Ethernet packet is to be forwarded to a local Ethernet station 14 or to a remote switch 12 via an Ethernet path 18, the receiving switch 12 forwards the Ethernet packet without translation. However if the Ethernet packet is to be forwarded to a local ATM station 16 or to a remote switch 12 via an ATM path 20, the receiving switch 12 first translates the Ethernet protocol transmission to an ATM protocol transmission before forwarding it to its destination. Conversely, when a switch 12 receives an ATM transmission it translates the ATM transmission to one or more Ethernet packets only when it is to be forwarded to a local Ethernet station 14 or to a remote switch 12 via an Ethernet path 18.

Routing Switch Architecture

Figure 2:
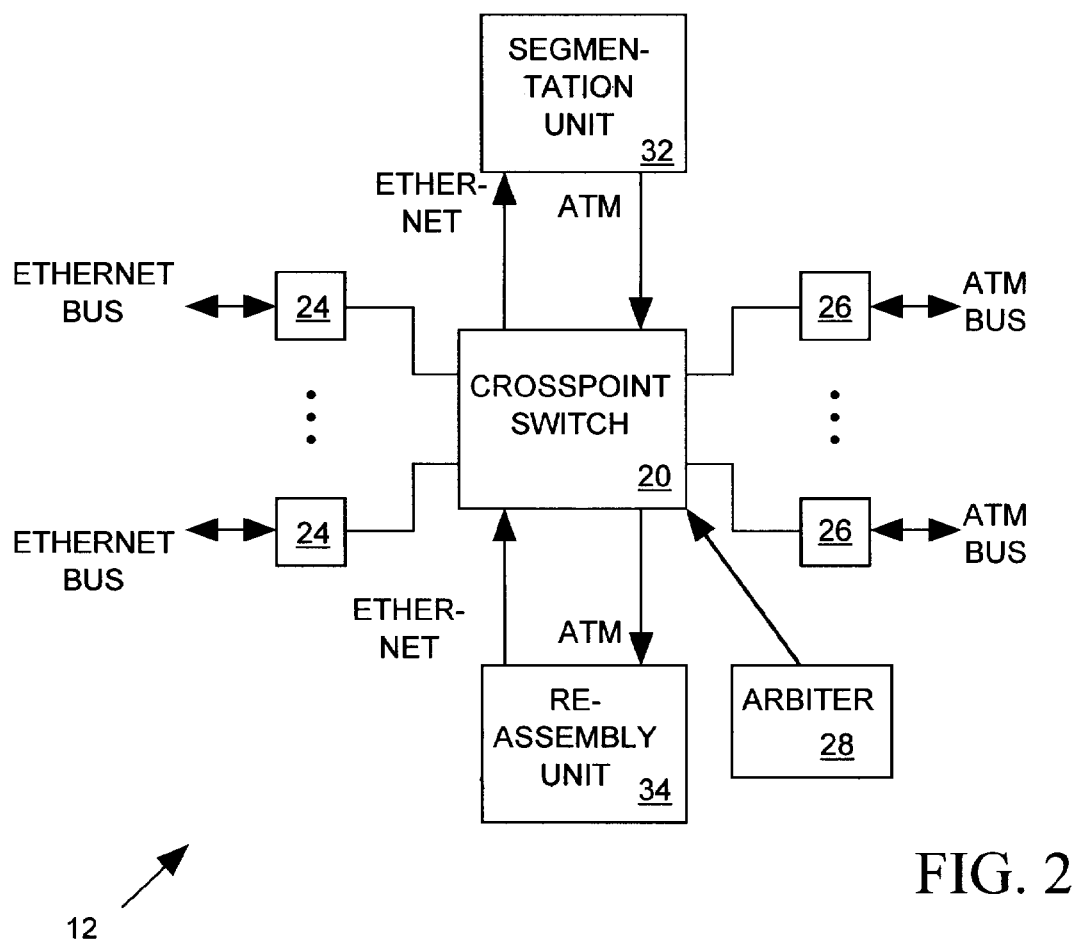
FIG. 2 illustrates one of the routing switches of FIG. 1 in more detailed block diagram form.

FIG. 2 illustrates one of the routing switches 12 of FIG. 1 in simplified block diagram form. Routing switch 12 includes a crosspoint switch 20 interconnecting a set of Ethernet I/O ports 24, and a set of ATM I/O ports 26. Routing switch 12 also includes a segmentation unit 32 for converting Ethernet packets into ATM transmissions and a reassembly unit 34 for converting ATM transmissions into Ethernet packets. Crosspoint switch 20 provides communication paths between I/O ports 24 and 26 and segmentation and reassembly units 32,34 in response to control data from a routing arbiter 28.

When an ATM port 26 receives an incoming ATM transmission via an ATM bus, it stores each cell of the transmission in an internal memory. Although cells of separate ATM transmissions may arrive interleaved at an ATM port 26, the port looks at data included in each incoming cell to determine the transmission to which it belongs and stores the ATM cell accordingly. The ATM port 26 also determines from information included in the ATM cells of each transmission how the transmission is to be forwarded through switch 20. If the ATM transmission is to be forwarded through another ATM port 26, the receiving ATM port 26 requests arbitrator 28 to route the transmission directly to the forwarding ATM port 26. When the forwarding ATM port 26 is idle (not busy forwarding another transmission), arbitrator 28 establishes a path between the receiving and forwarding ATM ports 26 through switch 20 and signals the receiving ATM port 26 to begin forwarding the ATM transmission to the forwarding ATM port 26.

On the other hand, if an ATM port 26 determines that an incoming ATM transmission is to be forwarded outward from switch 12 in the form of one or more Ethernet packets, the receiving ATM port 26 requests arbitrator 28 to route the ATM transmission to reassembly unit 34. When the reassembly unit 34 is ready to receive the ATM transmission, arbitrator 28 establishes a path through switch 20 between the receiving ATM port 26 and reassembly unit 34 and signals the receiving ATM port to begin forwarding the ATM transmission to the reassembly unit. Reassembly unit 34 then converts the ATM transmission to one or more Ethernet packets, determines which Ethernet port 24 is to forward the Ethernet packet(s), and then requests arbitrator 28 to route the Ethernet packet(s) through switch 20 to the forwarding Ethernet port 24.

When an Ethernet port 24 receives an incoming Ethernet packet it stores the packet and determines whether the data conveyed in the packet is to be forwarded outward from switch IL via another Ethernet port 24 via an ATM port 26. When the packet is to be forwarded by an Ethernet port, the receiving Ethernet port 24 requests arbitrator 28 to establish a path through switch 20 to the forwarding Ethernet port 24, and forwards the Ethernet packet when the path is established. When an Ethernet port 24 receives an Ethernet packet that is to be forwarded as an ATM transmission, the Ethernet port 24 requests arbitrator 28 to route the Ethernet packet through switch 20 to segmentation unit 32. Segmentation unit 32 then converts the Ethernet packet to an ATM transmission, determines which ATM port 26 is to forward the ATM transmission, and requests arbitrator 28 to route the ATM transmission to the forwarding ATM port 26.

Figure 3:
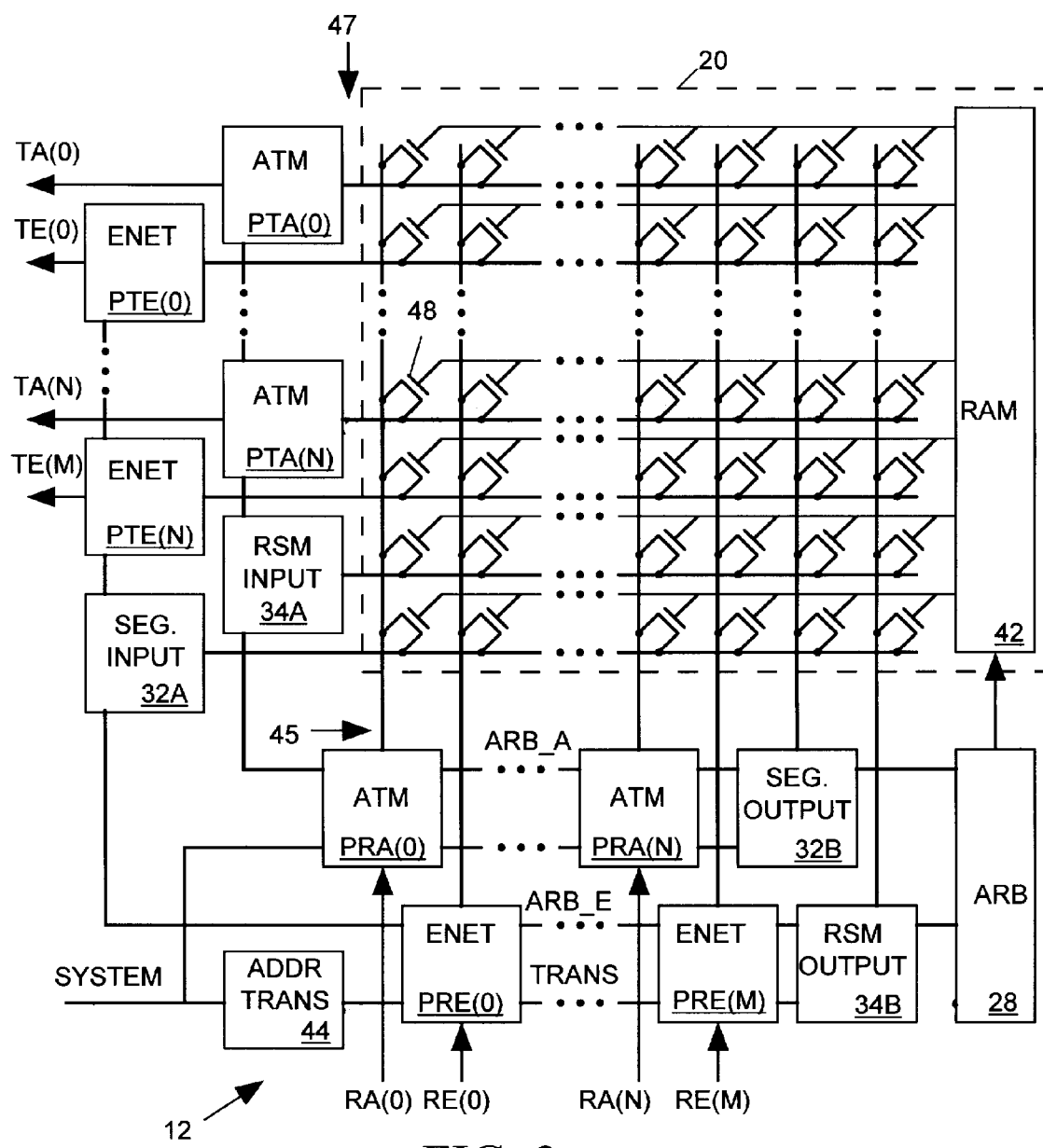
FIG. 3 illustrates a typical routing switch of FIGS. 1 and 2 in more detailed block diagram form.

FIG. 3 illustrates routing switch 12 of FIGS. 1 and 2 in more detailed block diagram form. Switch 12 includes N ATM I/O ports and M Ethernet I/O ports. Each ATM I/O port is shown in FIG. 3 as including two components: one of an ATM input ports PRA(0)–PRA(N) and a corresponding one ATM output ports PTA(0)–PTA(N). Each of the M Ethernet I/O ports is also shown as including two components: one of Ethernet input ports PRE(0)–PRE(M) and a corresponding one of Ethernet output ports PTE(0)–PTE(M). Incoming ATM transmissions arrive at input ports PRA(O)–PRA(N) via corresponding transmission lines RA(0)–RA(N) and incoming Ethernet packets arrive at input ports PRE(0)–PRE(M) via corresponding transmission lines RE(0)–RE(M). Outgoing ATM transmissions depart from output ports PTA(0)–PTA(N) via corresponding transmission lines TA(0)–TA(N) and outgoing Ethernet packets depart from output ports PTE(0)–PTE(M) via corresponding transmission lines TE(0)–TE(M). Segmentation unit 32 includes three components: an input interface 32A, an output interface 32B, and a processing section (not shown in FIG. 3) connected between its input and output interfaces. Similarly reassembly unit 34 also includes three components: an input interface 34A and an output interface 34B and a processing section (not shown in FIG. 3) connected between its input and output interfaces.

Crosspoint switch 20 includes a set of "vertical" conductors 45 connected to input ports PRA(0)–PRA(N) and PRE(0)–PRE(N) and to segmentation and reassembly unit output interfaces 32B and 34B. Switch 20 also includes a set of "horizontal" conductors 47 connected to input ports PRA(0)–PRA(N) and PRE(0)–PRE(N) and to the segmentation and reassembly unit input interfaces 32A and 34A. When turned on, a pass transistor 48 at each crosspoint between a horizontal conductor 47 and a vertical conductor 45 forms a signal path between the two conductors. Each bit of an M+N+2 bit data word at each address of a random access memory (RAM) 42 controls the on/off state of a separate one of the M+N+2 transistors 48 along one horizontal row of switch 20. To connect a particular input port to a particular output port, arbiter 28 writes one data word to RAM 42. That data word turns on one pass transistor 48 and turns off all others along the horizontal line 47 leading to the output port.

Arbitrator 28 communicates with all ATM input and output ports PRA(0)–PRA(N) and PTA(0)–PTA(N), the reassembly unit input interface 34A and the segmentation unit output interface 32B through a parallel arbitration bus ARB_A. Using the ARB_A bus, arbitrator 28 polls the ATM input and output ports to determine when and where an input port wants to send an ATM transmission and to determine whether an ATM output port is ready to receive and forward an ATM transmission. Arbiter 28 also uses the ARB_A bus to poll segmentation unit output interface 32B to determine when and where it wants to send an ATM transmission it has created and to poll reassembly unit input interface 34A to determine when it is ready to receive and reassemble an ATM transmission. The information obtained tells arbiter 28 how and when to route ATM transmissions through switch 20.

In a similar manner arbitrator 28 uses another parallel arbitration bus ARB_E to poll all Ethernet input and output ports PRE(0)–PRE(M) and PTE(0)–PTE(M), segmentation unit input interface 32A and reassembly unit output interface 34B in order to determine how and when to route Ethernet transmissions through switch 20.

ATM Cell Format and Header Translation

Figure 4A:
FIG. 4A illustrates the structure of an ATM cell.

FIG. 4A illustrates the structure of an ATM cell. The fixed length ATM cell includes a virtual path identifier (VPI), a virtual channel identifier (VCI), an error check field (CRC) and a data field (PAYLOAD). Each ATM cell is a part of an ATM transmission made up of a sequence of such ATM cells and all ATM cells forming an ATM transmission have the same VCI and VPI identifiers. The VPI field identifies a particular virtual path that the cells of the transmission is to follow through the network. The VCI field identifies a particular virtual channel of that path. Cells of several ATM transmissions assigned to the same virtual path may be interleaved if they are assigned to differing virtual channels because the VPI field in the cells distinguishes them by transmission. However, two ATM transmissions are assigned to the same virtual channel of the same virtual path, one transmission must follow the other; their cells may not be interleaved. An end of message (EOM) code included in the PAYLOAD field of the last cell of each transmission marks the boundary between that transmission and the next.

An ATM transmission can be routed from an ATM input port PRA(0)–PRA(N) or from segmentation unit output interface 32B either to one of ATM output ports PTA(0)–PTA(N) or to the reassembly unit input interface 34A. Each ATM and Ethernet input/out port PRA/PTA and PRE/PTE has a unique switch port ID. Segmentation and reassembly units 32,34 also have unique switch port IDs. Each ATM input port PRA(0)–PRA(N) and segmentation unit output interface 32B includes an internal lookup table relating each VPI value to the port ID of an ATM output port PTA(0)–PTA(N) or reassembly input unit 34B to which an ATM transmission having that VCI code is to be forwarded. The lookup table also indicates a relative forwarding "priority" for each combination of VCI and VPI. When an ATM input port PRA(0)–PRA(N) or the segmentation unit 34 is ready to forward an ATM transmission, it competes for a connection to the destination ATM output port PTA(0)–PTA(N) or to reassembly input unit 34A. Arbitrator 28 grants connections in order of forwarding priority. The RAM-based lookup tables in the ATM output ports and in segmentation output unit 32B are maintained by an external host supplying translation data via a conventional memory bus (SYSTEM).

Ethernet Packet Format and Address Translation

Figure 4B:
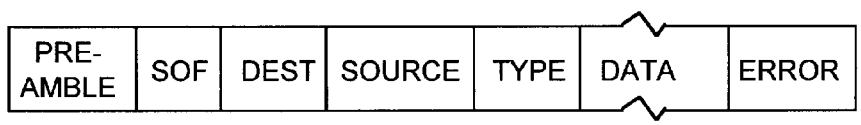
FIG. 4B illustrates the structure of an Ethernet packet.

FIG. 4B illustrates the structure of a standard Ethernet packet. An Ethernet packet includes a preamble, a start of frame delimiter (SOF), a destination address (DEST), a source address (SOURCE), a type field (TYPE), a data field (DATA) and an error check field (ERROR). All fields except the DATA field are fixed in length; the DATA field can range between 46 and 1500 bytes. Each Ethernet station in a network is identified by a unique network address. The destination address DEST contained in the packet indicates the network address of the station to receive the packet. The SOURCE address included in the packet indicates the station that sent the packet.

When an Ethernet input port PRE(0)–PRE(M) receives an incoming packet, it sends its own port ID, along with the packet's SOURCE and DEST fields, to an address translation system 44 (FIG. 3) via a parallel bus TRANS. Translation system 44 maintains a lookup table relating each network address of each network station to the switch port ID of an Ethernet I/O port that communicates with that station either directly or through another network switch. Address translation system 44 uses the incoming port ID and source network address to update its lookup table. It also responds to the incoming destination network address by returning the port ID of the switch output port PRE(0)–PTE(M) that can forward an Ethernet packet to the network station identified by the destination address. Later, when it is ready to send the packet onward, the Ethernet input port PRE(0)–PRE(M) arbitrates for the right to forward the packet to the indicated Ethernet output port. When reassembly unit 34 converts an ATM transmission into an Ethernet packet, it also accesses address translation unit 44 via the TRANS bus to obtain the port ID of the Ethernet output port PTE(0)–PTE(M) to receive and forward the packet.

Address translation system 44 distinguishes Ethernet ports from ATM ports. When an Ethernet input port PRE(0)–PRE(M) has received a packet that must be converted to an ATM transmission, and sends the packet's destination address to address translation system 44, the address transmission system returns the switch port ID of the segmentation input unit 32A instead of a switch port ID of a switch port associated with the packet's destination address. This causes the Ethernet input port PRE(0)–PRE(M) that received the packet to request arbitrator 28 to forward the packet to segmentation unit 32 where it can be converted into an ATM transmission. The external host writes the data into translation table 44 via the SYSTEM bus that is needed to relate a network destination address to the segmentation unit.

ATM Input Port Architecture

Figure 5:
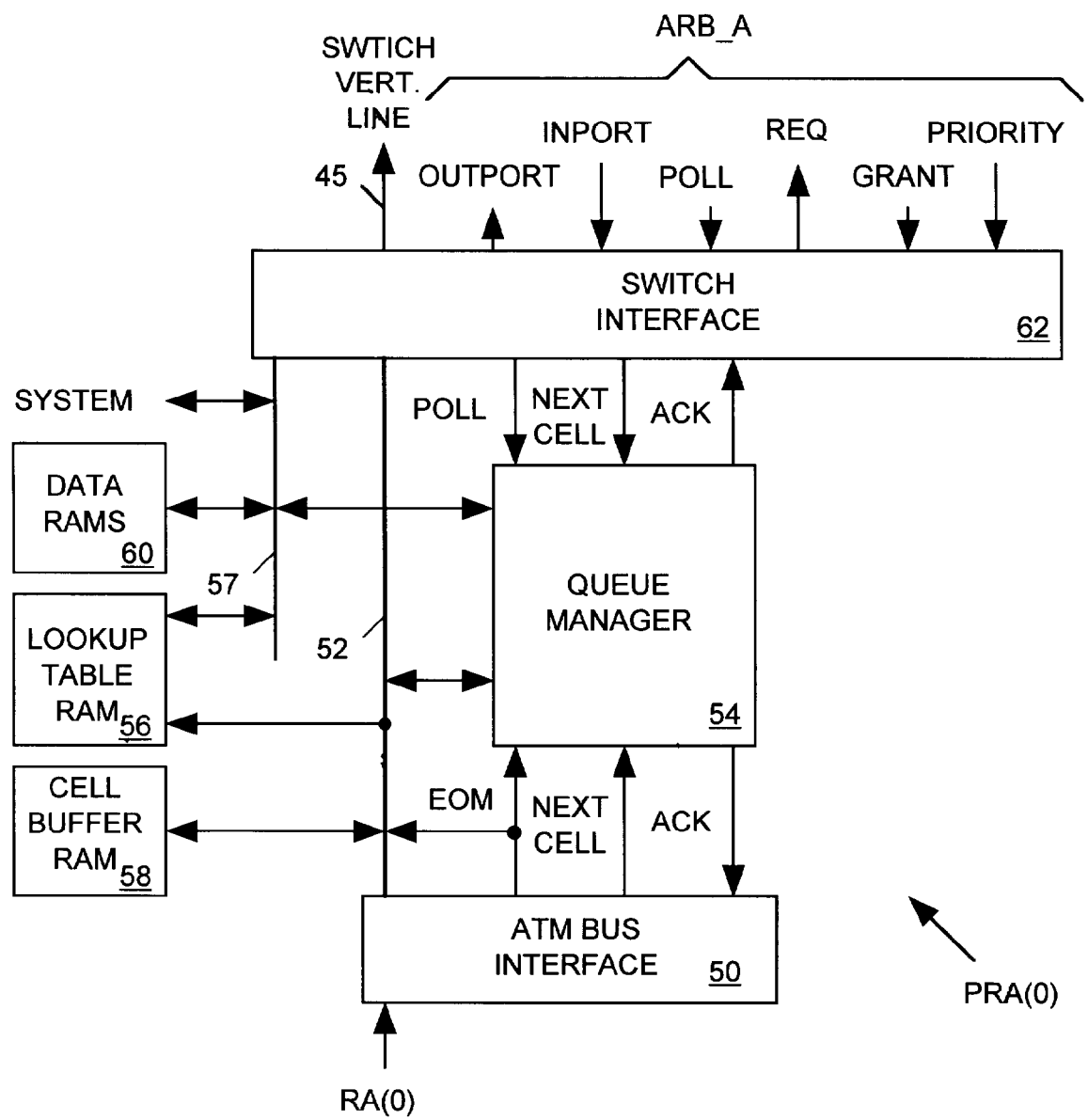
FIG. 5 illustrates an ATM input port of FIG. 3 in more detailed block diagram form.

FIG. 5 illustrates ATM input port PRA(0) of FIG. 3 in more detailed block diagram form. Other ATM input ports PR(1)–PR(N) are similar. ATM input port PRA(0) includes a conventional ATM bus interface circuit 50 which receives each ATM cell arriving on line RA(0), converts it to parallel form, and stores it in an internal FIFO buffer. When ready to forward a cell out of its FIFO buffer, bus interface circuit 50 sends a NEXT CELL signal to a queue manager 52. When ready to process the cell, queue manager 54 sends an acknowledge (ACK) signal to bus interface circuit 50. Interface circuit 50 then places the cell on a bus 52. ATM bus interface 50 also parses the payload of the ATM cell to determine if it contains the end of message (EOM) code. If it does, bus interface 50 sends an EOM signal to queue manager 54 and places an EOM bit on a line of bus 52. The VPI and VCI fields of the ATM cell on bus 52 provide input to a RAM-based lookup table 56 relating the VPI and VCI data values to a unique connection ID (CONID), a priority level (PRIORITY) and the ID (PORTID) of an output port or reassembly unit to receive the ATM transmission. In response to a signal from queue manager 54, lookup table 56 places its output PORTID, CONID, and PRIORITY data on lines of a bus 57.

Queue manager 54 stores an ATM cell appearing on bus 52 in a cell buffer RAM 58. A set of RAMs 60 implement lookup tables which keep track of where in RAM 58 the ATM cells for each transmission are stored and the priority of each transmission. Queue manager 54 read accesses the tables in RAMs 60 based on the CONID and PRIORITY data appearing on bus 57 to determine an address within cell buffer RAM 58 at which an incoming ATM cell on bus 52 is to be stored. When one of RAMs 60 reads that address onto address lines of bus 52 queue manager 54 sends a write signal to RAM 58 causing it to store the ATM cell and the EOM bit, if any, appearing on bus 52 at that address. Queue manager 54 then updates tables in RAMs 60 to record the storage location of that ATM cell and to record the PORTID and PRIORITY levels associated with its transmission.

ATM input port PRA(0) includes a switch interface circuit 62 providing a link between the input port to a vertical line 45 of crosspoint switch 20 of FIG. 3. Switch interface circuit 62 also provides a communication link between the ATM arbitration bus ARB_A and queue manager 54. Arbiter 28 of FIG. 3 periodically polls each ATM input port to determine if it is ready to forward a complete ATM transmission of a particular priority to an ATM output port or to the segmentation unit. To poll an input port, the arbiter 28 places the input port's ID on INPORT lines of the ARB_A bus and pulses a POLL signal. It also places a priority code on PRIORITY lines of the ARB_A bus. If it is not busy forwarding an ATM transmission to an output port, switch interface circuit 62 of the input port having the port ID appearing on the INPORT lines places the priority value on lines of bus 57 and forwards the POLL signal to queue manager 54. Queue manager 54 then write accesses RAMs 60 to determine whether the port is ready to forward a transmission having that priority. If so, queue manager 54 causes RAM 60 to read out the port ID of the output port (or reassembly unit) that is to receive the transmission onto lines of bus 57. Switch interface circuit 62 puts the output port ID on OUTPORT lines of the ARB_BUS and asserts an ARB_A bus request line (REQ). Each output port monitors the OUTPORT and REQ lines and in response to the REQ line, the output port having the ID appearing on the OUTPORT lines signals arbiter 28 (FIG. 3) as to whether it is idle or busy receiving a transmission. If the requested output port is idle, the arbiter establishes a connection between the requesting input port and the requested output port and pulses a GRANT signal line of the ARB_A bus. Switch interface circuit 62 responds to the GRANT signal by pulsing a NEXT CELL signal to queue manager 54. Queue manager 54 responds to each NEXT CELL signal pulse by causing RAM 58 to read out an ATM cell of the ATM transmission onto bus 52 to forward the cell to switch interface 62. Queue manager then sends an acknowledge signal [ACK] to switch interface circuit 62. Switch interface circuit 62 then serializes, 4B5B encodes and forwards the cell to the output port via vertical line 45 of the crosspoint switch. (4B5B encoding is discussed below.) When queue manager 54 sends the last cell of the transmission to switch interface 62, an EOM bit appearing with the last ATM cell on bus 52 tells switch interface 62 that the input port is to be idle. After forwarding the last cell, switch interface 62 awaits the next poll from the arbiter.

ATM Input Port Data Structures

Figure 6:
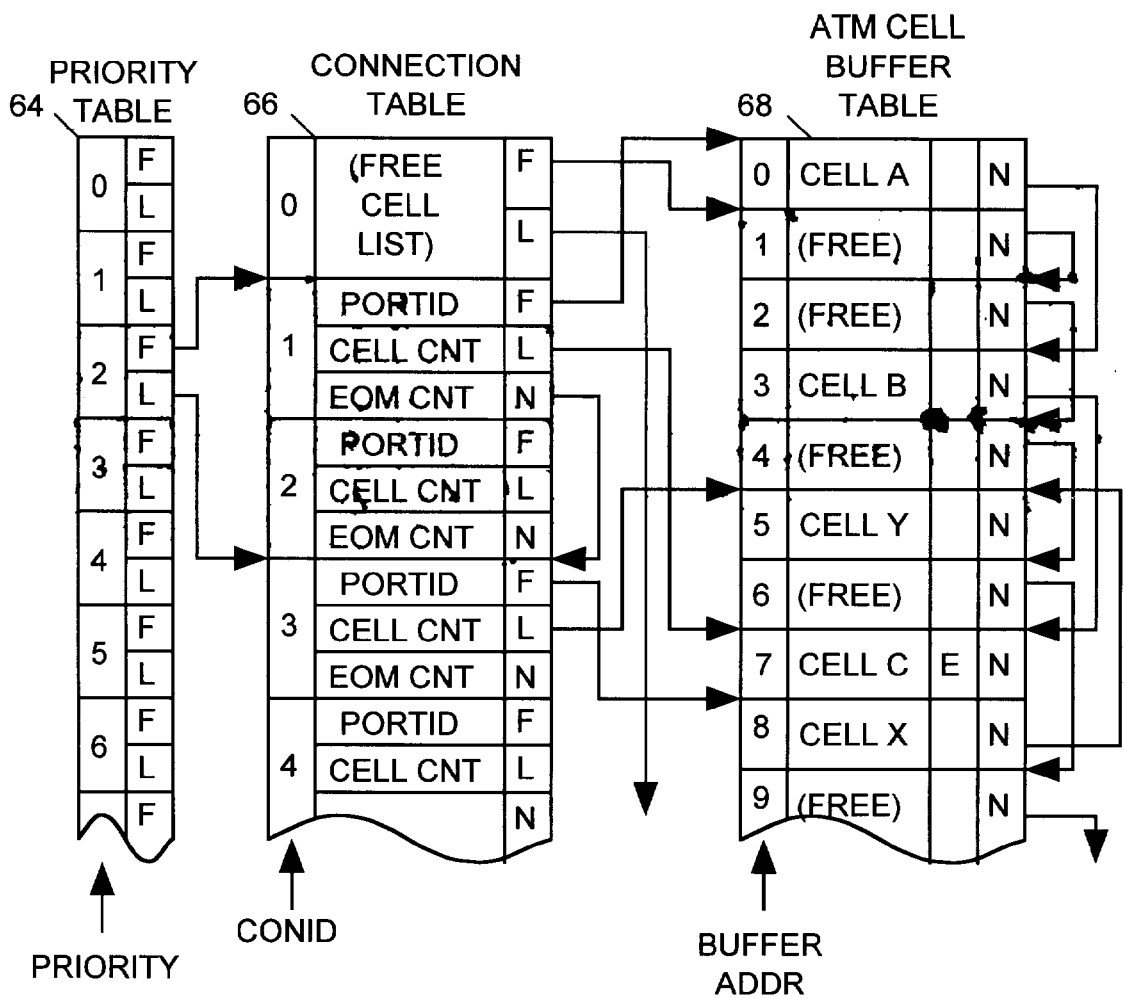
FIG. 6 illustrates the data structures maintained by the input port of FIG. 5.

FIG. 6 illustrates the data structures stored in RAMs 58 and 60 of input port PRA(0) of FIG. 5. RAM 58 acts as an ATM cell buffer table 68, storing one ATM cell at each address. Each ATM cell buffer containing an ATM cell also stores a next cell pointer "N" to a cell buffer containing a next ATM cell of the same transmission items. Thus, the cell buffers use their N pointers to form linked lists. Each linked list corresponds to a separate virtual channel and contains all of the ATM cells assigned to that virtual channel in the order they arrive at the port. Each cell buffer stores a bit "E" set when the cell buffer contains such an EOM cell. All ATM cell buffer locations not currently storing an ATM cell form a separate "free cell linked list". The CONID output at RAM 56 references a particular linked list to which the incoming cell is to be added. A connection table 66 implemented by one of RAMs 60 addressed by the CONID data contains an entry for the free cell liked list and one entry for each linked list in the ATM cell buffer table 68. Each connection table entry includes a pointer "F" to the first cell buffer of the corresponding linked list, a pointer "L" to the last cell buffer of the linked list, the ID (PORTID) of the output port to which the ATM transmission is to be forwarded, a data value "Cell CNT" indicating the number of cells in the linked list, and data value EOM CNT indicating the number of complete ATM transmissions included in the linked list.

Connection table 66 entries are also organized into linked lists, one for each possible forwarding priority level. All connections having the same priority are linked by the same connection table list. A priority table 64 implemented by one of RAMs 60 addressed by a PRIORITY data value includes an entry for each priority level. Each priority table entry includes pointers F and L to the first and last entry of the connection table 66 linked list for the corresponding priority level. The manner in which queue manager 54 of FIG. 5 uses and maintains the tables illustrated in FIG. 6 is discussed below.

ATM Output Port Architecture

Figure 7:
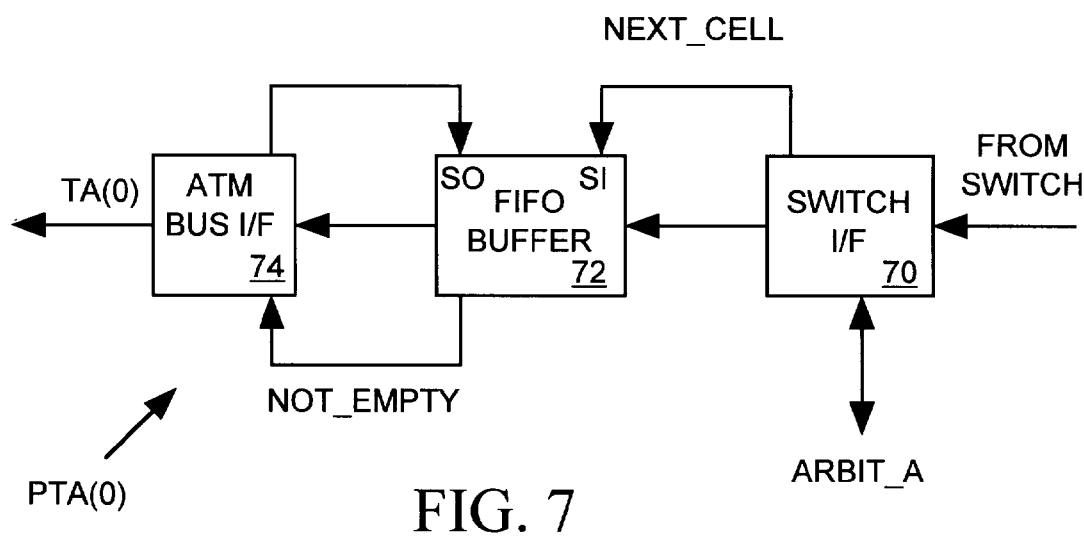
FIG. 7 illustrates the ATM output port of FIG. 3 in more detailed block diagram form.

FIG. 7 illustrates ATM output port PTA(0) of FIG. 3 in more detailed block diagram form. Output ports PTA(1) –PTA(N) are similar. Output port PTA(0) includes a switch interface circuit 50 for receiving serial transmissions of 4B5B encoded, serialized ATM cells from crosspoint switch 20 of FIG. 3. Switch interface circuit 70 4B5B decodes and deserializes each cell and stores it in a first-in, first-out (FIFO) buffer 72 by pulsing a shift-in(SI) input of buffer 72. When not empty, FIFO buffer 72 sends a NOT_EMPTY signal to an ATM bus interface circuit 74. ATM bus interface circuit 74 responds by strobing a shift out (SO) FIFO buffer 52 control input causing the FIFO buffer to shift out a longest stored ATM cell. ATM bus interface circuit 74 then serializes the ATM cell and transmits it outward on ATM bus TA(0) using ATM protocol. As discussed below, arbiter 28 of FIG. 3 polls switch interface circuit 70 via the ARBIT_A bus to determine when output port PTA(0) is idle.

ATM Arbitration

Figure 8:
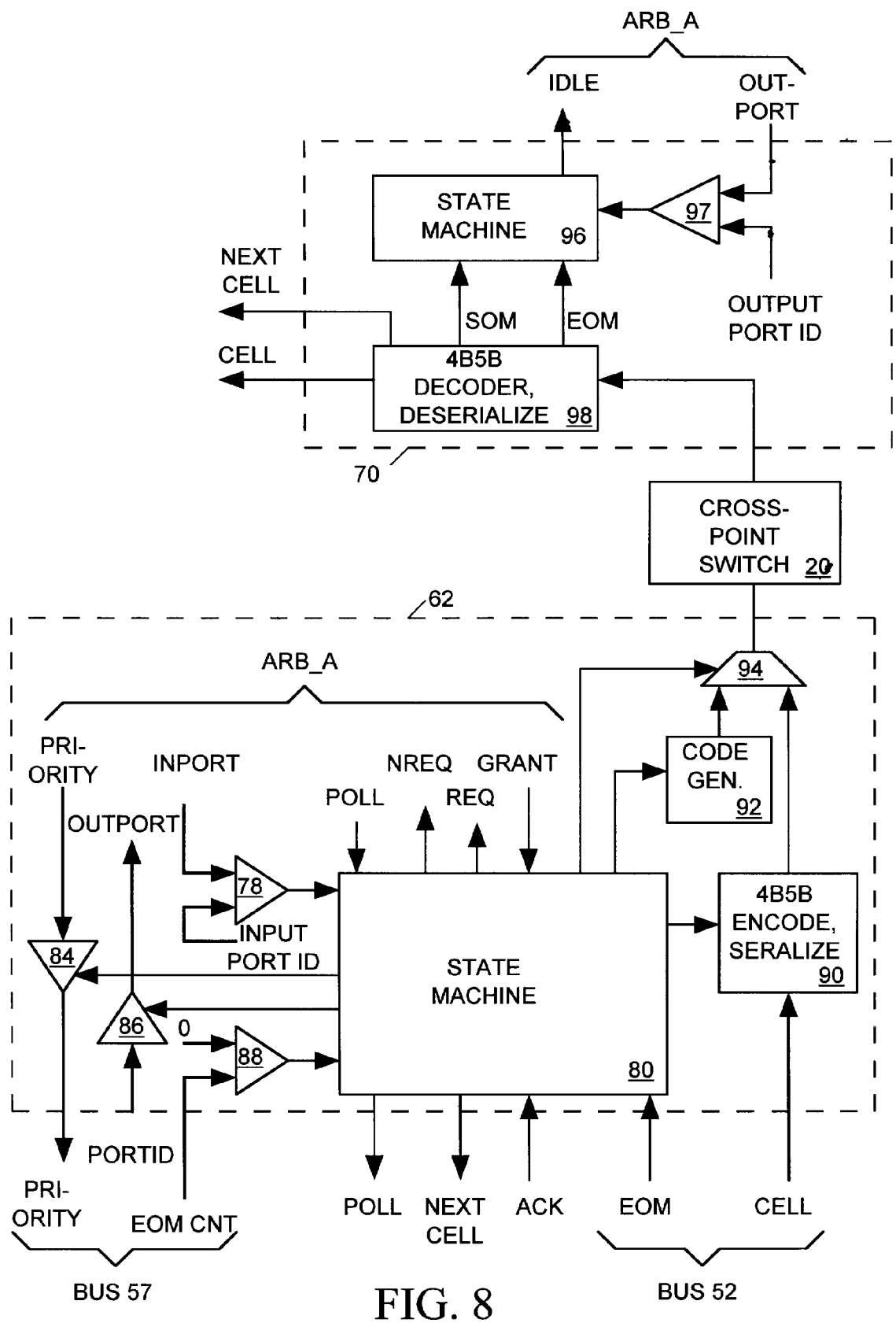
FIG. 8 illustrates the ATM output port switch interface circuit of FIG. 5 and the ATM input port switch interface circuit of FIG. 7 in more detailed block diagram form.

FIG. 8 illustrates ATM output port switch interface circuit 62 of FIG. 5 and ATM input port switch interface circuit 70 of FIG. 7 in more detailed block diagram form. To poll an ATM input port, arbiter 28 of FIG. 3 places a priority level value and input port ID on the PRIORITY and INPORT lines of the ARB_A bus and pulses the POLL line of the ARB_A bus. A comparator 78 compares the input port's PORT ID with the input port ID on the INPUT lines and signals a state machine 80 when they match. When the port is busy forwarding an ATM transmission to an output port, state machine 80 pulses an NREQ line of the ARB_A bus to indicate that it does not want to request a connection to an output port. The arbiter then polls another input port. When the polled input port 62 is not busy forwarding an ATM transmission to an output port, a state machine 80 responds to the signal from comparator 78 and the POLL signal pulse by forwarding the PRIORITY line data via a buffer 82 to lines of bus 57 via a buffer 84, by connecting other lines of bus 57 to the OUTPORT lines of the ARB_A bus via a buffer 86, and by forwarding the POLL signal to input port queue manager 54 of FIG. 5.

Using the PRIORITY data (for example Priority=z) appearing on the ARB_A bus to address the priority table 64 of FIG. 6, queue manager 54 causes the first connection table 66 entry for that priority (e.g. entry 1). If the input ports stores no completed ATM transmissions at that priority level, the EOM count will be 0. A comparator 88 in interface circuit 62 compares the EOM count on bus 57 to 0 and signals state machine 80 accordingly. If the EOM count is 0, state machine 80 pulses the NREQ line to indicate that is not requesting a connection. If the EOM count is greater than 0, state machine 80 causes buffer 86 to put the output port ID readout of table 66 on the OUTPORT lines of the ARB_A bus and pulses the REQ line of the ARB_A bus to request a connection to an output port. If the output port referenced by the port ID now appearing on the OUTPORT lines is idle, it pulses an IDLE line of the ARB_A bus causing the arbiter to establish a connection through crosspoint switch 20 to the referenced output port.

Upon establishing the connection, the arbiter pulses a GRANT signal line of the ARB_A bus. State machine 80 responds by signaling a code generator circuit 92 to transmit a 4B5B encoded "start of transmission" code sequence via a multiplexer 94 through crosspoint switch 20 to the output port. When the output port detects this sequence it prepares to receive the ATM transmission. State machine 80 then sends a NEXT_CELL signal to queue manager 54 causing queue manager 54 to send the first cell of the stored ATM transmission outward on bus 52 to a circuit 90. Queue manager 54 then pulses an acknowledge signal (ACK) input to state machine 80. State machine 80 than signals circuit 90 to serialize the cell and convert it to the well-known "4B5B" encoded form. In this form of encoding, each 4-bit nibble of the cell is converted into a 5-bit code. While many 5-bit 4B5B codes correspond to encoded 4-bit values, some 5-bit 4B5B code values are reserved for use as various synchronizing codes, start and end of message codes and the like. State machine 80 forwards each encoded ATM cell to output port switch interface circuit 70 via multiplexer 94 and switch 20. Thereafter, queue manager 54 sends each cell of the ATM transmission to circuit 90 in response to each NEXT CELL signal pulse and state machine 80 responds to each ACK signal pulse by forwarding the encoded serialized cell from circuit 90 to the interface circuit 70 of the destination output port. When the last CELL of the transmission appears on BUS 52 the EOM bit stored with that cell appears on a line of bus 52 providing input to state machine 80. After forwarding that cell to the output port, state machine 80 signals code generator 92 and multiplexer 94 to send an end of transmission code to the output port. The EOM bit also tells queue manager 54 to decrement the EOM count in the connection table entry to update the free cell list and to remove the freed ATM cell buffer table entries from the cell buffer linked list.

Output port switch interface circuit 70 of FIG. 7, shown in more detail in FIG. 8, includes a state machine 96 and a comparator 97. Comparator 97 compares the output port's ID to the port ID appearing on the OUTPORT lines of the ARB_A bus and signals state machine 96 when they match. When they match, and when the output port is not busy receiving a transmission from an input port, state machine 96 asserts the IDLE signal line of the ARB_A bus.

Output port switch interface circuit 70 also includes a 4B5B decoder and deserializer circuit 98 which receives, decodes and deserializes transmissions from the input port via switch 20 to produce an output sequence of ATM cells.

On producing each cell of the sequence, circuit 98 pulses a NEXT_CELL signal which shifts the cell into FIFO buffer 72 of FIG. 7. Circuit 98 also sends SOM and EOM signal signals to state machine 96 to indicate when it detects a start and end of message codes in its input data stream. These signals tell state machine 96 whether the output port is busy or idle.

Ethernet Input Port Architecture

Figure 9:
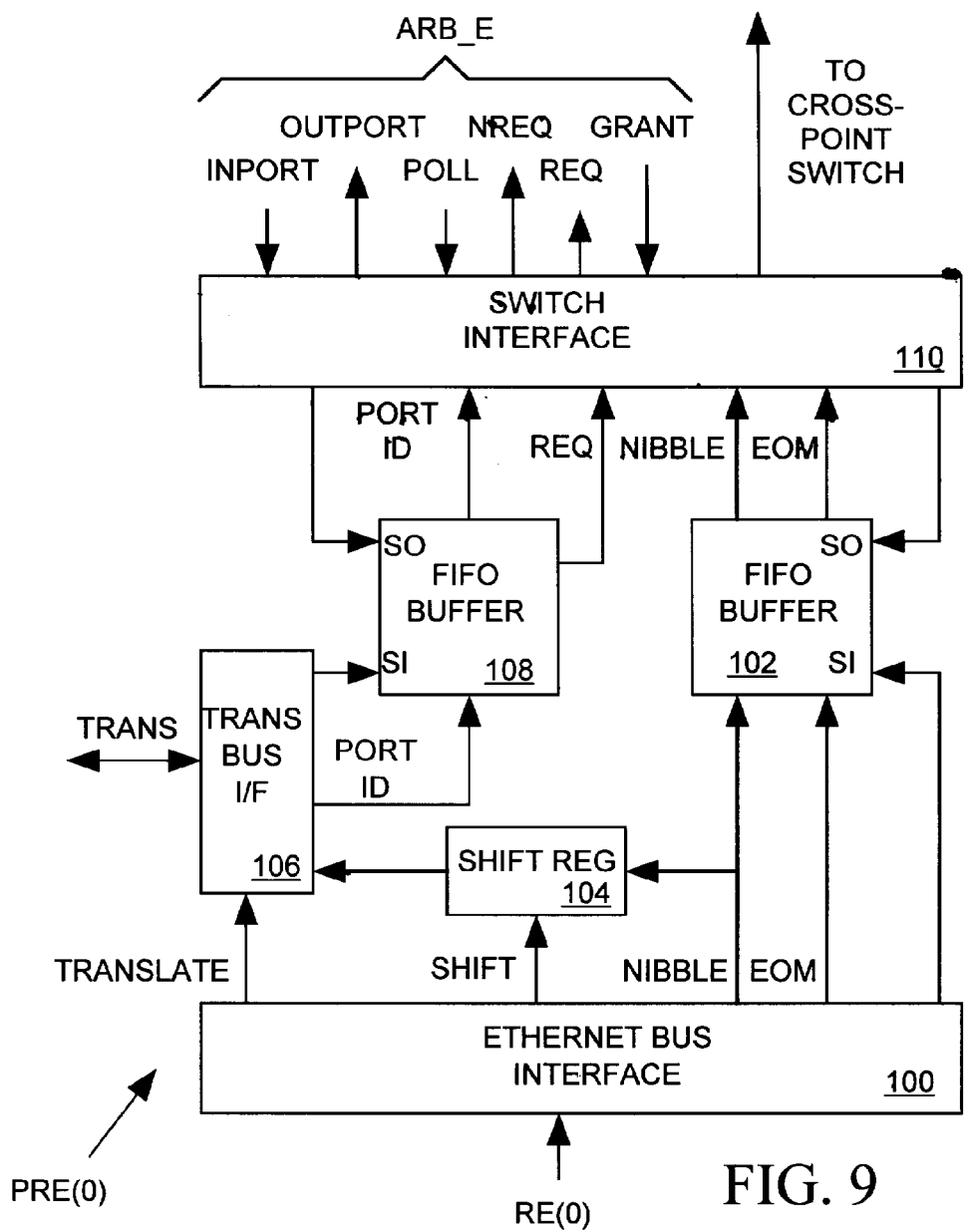
FIG. 9 illustrates the Ethernet input port of FIG. 3 in more detailed block diagram form.

FIG. 9 illustrates Ethernet input port PRE(0) of FIG. 3 in more detailed block diagram form. Ethernet input ports PRE(1)–PRE(M) are similar. Ethernet input port PRE(0) includes an Ethernet bus interface circuit 100 for receiving Ethernet transmissions on input Ethernet line RE(0). Bus interface 100 shifts each 4-bit nibble of a transmission into a FIFO buffer 102. Also, as the source and destination address fields of an incoming Ethernet packet arrive, interface circuit 100 shifts them into a serial-in, parallel-out shift register 104. As the last nibble of the incoming Ethernet packet is shifted into FIFO buffer 104, bus interface 100 also shifts an EOM bit into FIFO buffer 102. At the same time, it sends a TRANSLATE signal to a translation bus interface circuit 106. Interface circuit 106 responds by reading the source and destination fields out of shift register 104 and sending them to address translation lookup table 44 of FIG. 3 via the TRANS bus. When translation lookup table 44 returns the switch port ID of the output port that is to receive the packet, interface circuit 106 shifts it into a FIFO buffer 108. When FIFO buffer 108 is not empty it asserts a request signal (REQ) to a switch interface circuit 110 to indicate that the port is storing a complete Ethernet packet.

Arbiter 28 of FIG. 3 polls the input port by placing the input port's ID on INPORT lines of the ARB_E bus and pulsing a POLL line of the ARB_E bus. When the polled input port is busy forwarding data, or when the REQ signal output of FIFO buffer 108 indicates that FIFO buffer 102 is empty, switch interface circuit 110 pulses an NREQ line of the ARB_E bus to tell the arbiter 28 that is not requesting a new connection. Otherwise if the input port is idle and the REQ signal from FIFO buffer 108 is asserted, switch interface circuit 110 responds to a poll by placing the PORT ID output of FIFO buffer 108 on the OUTPUT lines of the ARB_E bus and pulsing the REQ line of the ARB_E bus. If the output port identified by the ID on the OUTPORT lines is idle, arbiter 28 of FIG. 3 connects the input port to the idle output port and pulses a GRANT line of the ARB_E bus. Switch interface circuit 110 then begins shifting nibbles out of FIFO buffer 102, 4B5B encoding and serializing them, and forwarding them to the output port via switch 20 of FIG. 3. The EOM bit shifted out of FIFO buffer 102 with the last nibble of the Ethernet packet signals switch interface 110 to stop forwarding data and to shift the port ID out of FIFO buffer 108 and wait for another poll.

Ethernet Output Port Architecture

Figure 10:
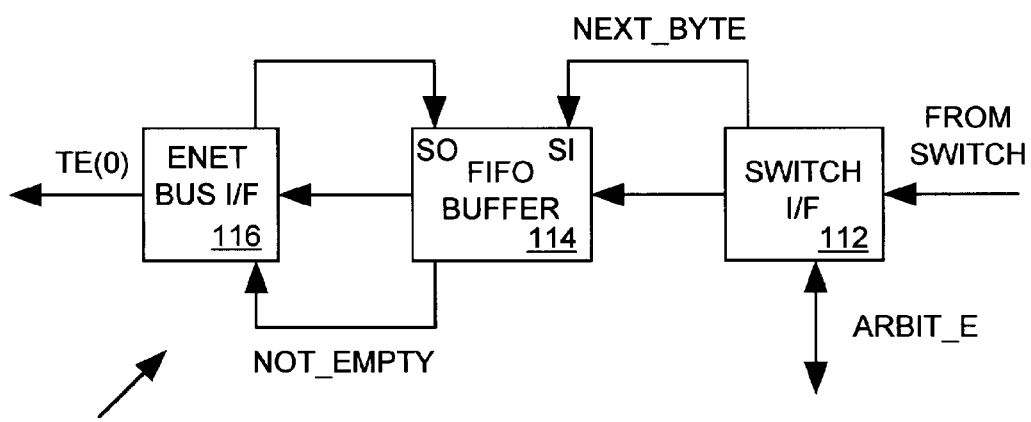
FIG. 10 illustrates the Ethernet output port of FIG. 3 in more detailed block diagram form.

FIG. 10 illustrates Ethernet output port PTE(0) of FIG. 3 in more detailed block diagram form. Ethernet output ports PTE(1)–PTE(M) are similar. Output port PTE(0) includes a switch interface circuit 112 for receiving serialized, 4B5B encoded packets from an Ethernet input port via crosspoint switch 20 of FIG. 3. Circuit 112 decodes and deserializes the packet data to produce an output byte sequence that it shifts into a FIFO buffer 114. An Ethernet interface circuit 116 shifts out and serializes the byte sequence and forwards it outward as an Ethernet transmission on Ethernet bus line TE(0).

Ethernet Arbitration

Figure 11:
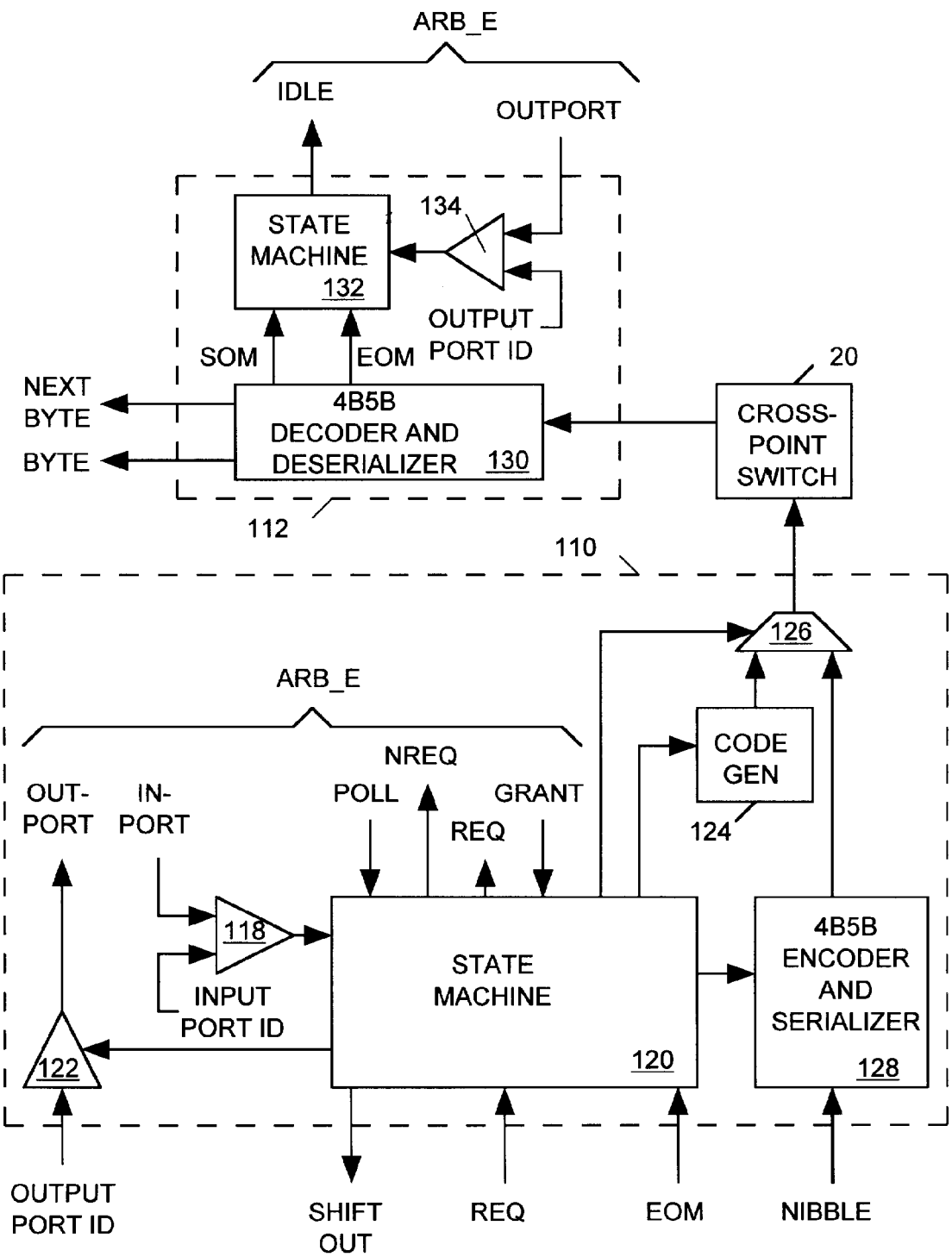
FIG. 11 illustrates the input port switch interface of FIG. 9 and the output port switch interface of FIG. 10 in more detailed block diagram form.

FIG. 11 illustrates input port switch interface 110 of FIG. 9 and output port switch interface 112 of FIG. 10 in more detailed block diagram form. Arbitrator 28 of FIG. 3 polls an Ethernet input port by placing its ID on the INPORT lines of the ARB_E bus and pulsing the POLL line of that bus. Input port switch interface 110 includes a comparator 118 for signaling a state machine 120 when the input port ID on an INPORT line of the ARB_E bus matches the input port's ID. In such case state machine 120 responds to the POLL by pulsing the NREQ signal line of the ARB_E bus if the port is busy forwarding data to an output port or if the REQ signal from buffer 108 of FIG. 9 is not asserted. Otherwise state machine 120 turns on a tristate buffer 122 to place the output port ID output of FIFO buffer 108 on the OUTPORT lines of the ARB_E bus and then asserts the REQ signal. If the output port having that ID is idle, arbiter 28 of FIG. 3 establishes a connection between the requesting input port and the idle output port and then pulses the GRANT signal line of the ARB_E bus. State machine 120 signals a code generator circuit 124 to send a 4B5B start of message code via a multiplexer 126 signals crosspoint switch 20 to output port interface circuit 112. State machine 120 then begins shifting 4-bit nibbles of the Ethernet packet out of FIFO buffer 108 of FIG. 9 and clocking them through a 4B5B encoder and serializer circuit 128. The encoded and serialized nibbles then pass through multiplexer 126 and crosspoint switch 20 to output port interface circuit 112. An EOM bit emerging from FIFO buffer 108 with the last nibble of the Ethernet packet signals state machine 120. State machine 120 then signals code generator 124 to send an end of message code to output port interface circuit 112. Thereafter state machine 120 considers the input port idle and awaits another poll.

Output port interface circuit 112 includes a 4B5B decoder and deserializer circuit 130 for converting the 4B5B encoded serial data stream from input port 110 into a byte sequence and loading it into FIFO buffer 114 of FIG. 10. Circuit 130 also transmits SOM and EOM signals to a state machine 132 when it detects the start of message and end of message codes in the data stream. When the output port is not busy forwarding data from an input port, state machine 132 asserts the IDLE signal line of the ARB_E bus when a comparator 134 signals that the ID on the OUTPORT line of the ARB_E bus matches the output port's ID.

Arbiter

Figure 12:
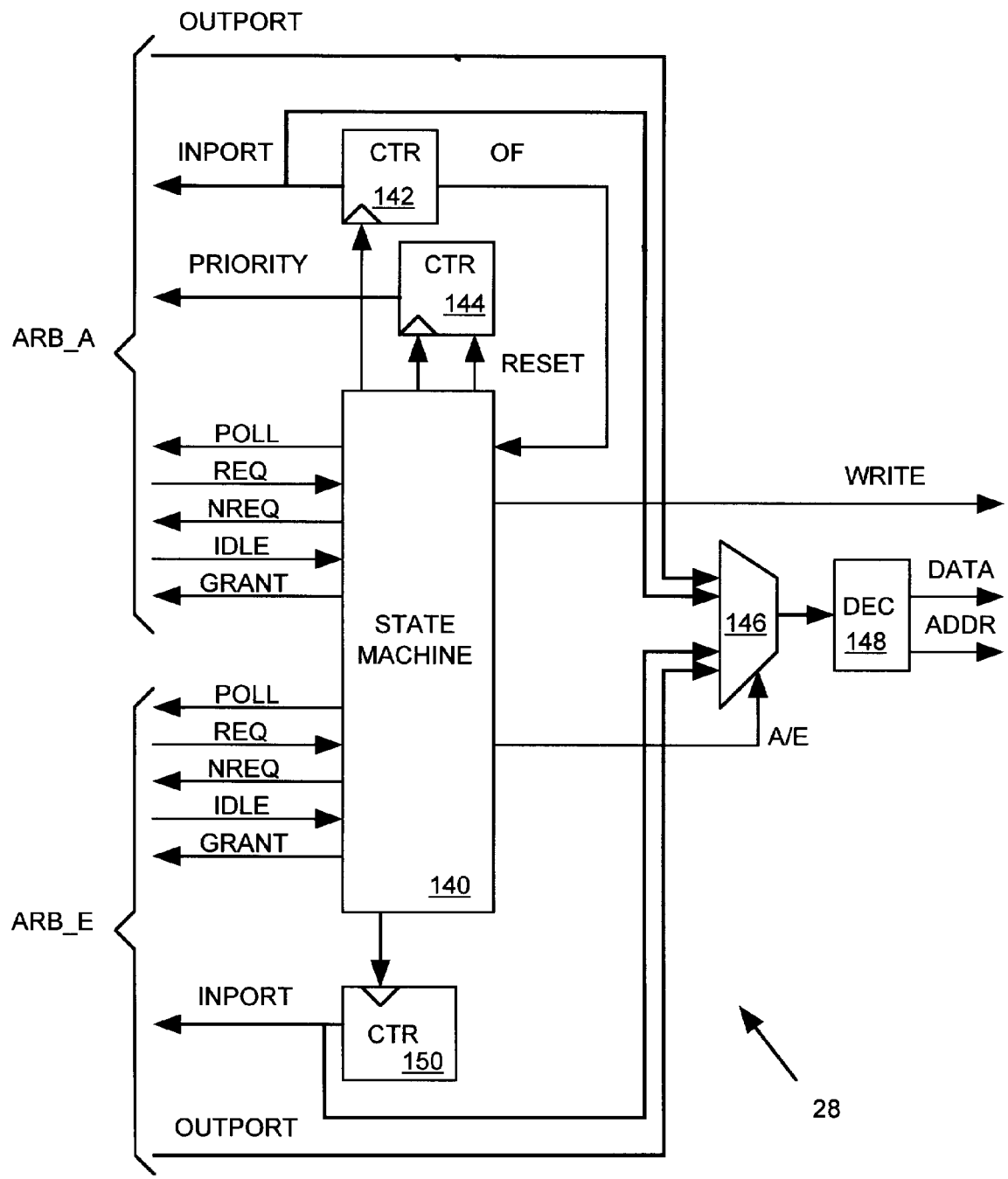
FIG. 12 illustrates the arbiter of FIG. 3 in more detailed block diagram form.

FIG. 12 illustrates arbiter 28 of FIG. 3 in more detailed block diagram form. Arbiter 28 includes a state machine 140 which alternates between ATM and Ethernet arbitration modes. In the ATM mode, state machine 140 clocks a counter 142 to increment the port ID on the INPORT lines of the ARB_A bus and clocks a counter 144 that produces the priority level conveyed on the PRIORITY lines of the ARB_A bus. Each time counter 142 is clocked it increments the input port ID until it overflows. At that point it resets its output count to 0 and signals state machine 140. When state machine 140 resets counter 144, counter 144 outputs the highest priority code and thereafter decrements that priority code each time that it is clocked thereafter. Upon counting down to 0, counter 144 resets its output to the highest priority code.

State machine 140 initially resets counter 142. It then pulses the ARB_A bus POLL signal and waits until it detects an REQ or NREQ signal from the polled input port. If an NREQ signal pulse is returned, state machine 140 clocks counter 142 to select a next input port to poll and, if counter 142 overflows, clocks counter 144 to select a next lower priority. State machine 140 then polls the next input port. If the REQ signal is returned in response to an input port poll, but an output port does not assert the IDLE line of the ARB_A bus, state machine 140 polls a next input port. If state machine 140 detects assertion of an REQ signal from a polled input port and detects an IDLE signal from a requested output port, it sets an output signal A/E to switch a multiplexer 146 so that it passes the input and output port ID's on the ARB_A bus INPORT and OUTPUT lines to a decoder 148. Decoder 148 converts the input and output port ID's to address and data inputs to RAM 42 of FIG. 3 that will establish a connection between the input and output ports through crosspoint switch 20 of FIG. 3. State machine 140 next pulses a write signal input to RAM 42 of FIG. 3 to write the data into RAM 42, thereby establishing the connection between the ports. State machine 140 then pulses the GRANT signal time of the ARB-A bus to tell the input port that it may begin transmitting data. State machine 140 thereafter resets counter 144 to produces the highest priority output code and begins the polling process once again.

Thus for each priority level arbiter 28 polls each ATM input port in turn to determine if that input port is ready to forward an ATM transmission to an idle input port. Arbiter works its way down the priority levels until it finds such an input port, establishes the connection, and then starts over again polling the ports at the highest priority level.

In the Ethernet mode, state machine 140 clocks a counter 150 to increment the port ID on the INPORT lines of the ARB_E bus. State machine 140 initially pulses the ARB_E bus POLL signal and waits until it detects a REQ or NREQ signal from the polled input port. If an NREQ signal pulse is returned, state machine 140 clocks counter 150 to select a next input port to poll then polls the next input port. If the polled input port returns the REQ signal, but a requested output port does not assert the IDLE line of the ARB_A bus, state machine 140 polls a next input port. If a polled input port asserts the REQ signal and a requested output port asserts IDLE signal, state machine 140 sets output signal A/E so that switch multiplexer 146 passes the input and output port ID's on the ARB_E bus INPORT and OUT-PORT lines to decoder 148 and then pulses the WRITE signal input to RAM 42 of FIG. 3 to write data into RAM 42. This establishes the connection between the requesting input port and the requested output port. State machine 140 then pulses the GRANT signal to tell the input port that it may begin forwarding data. State machine 140 thereafter polls a next input port.

Reassembly Unit

Figure 13:
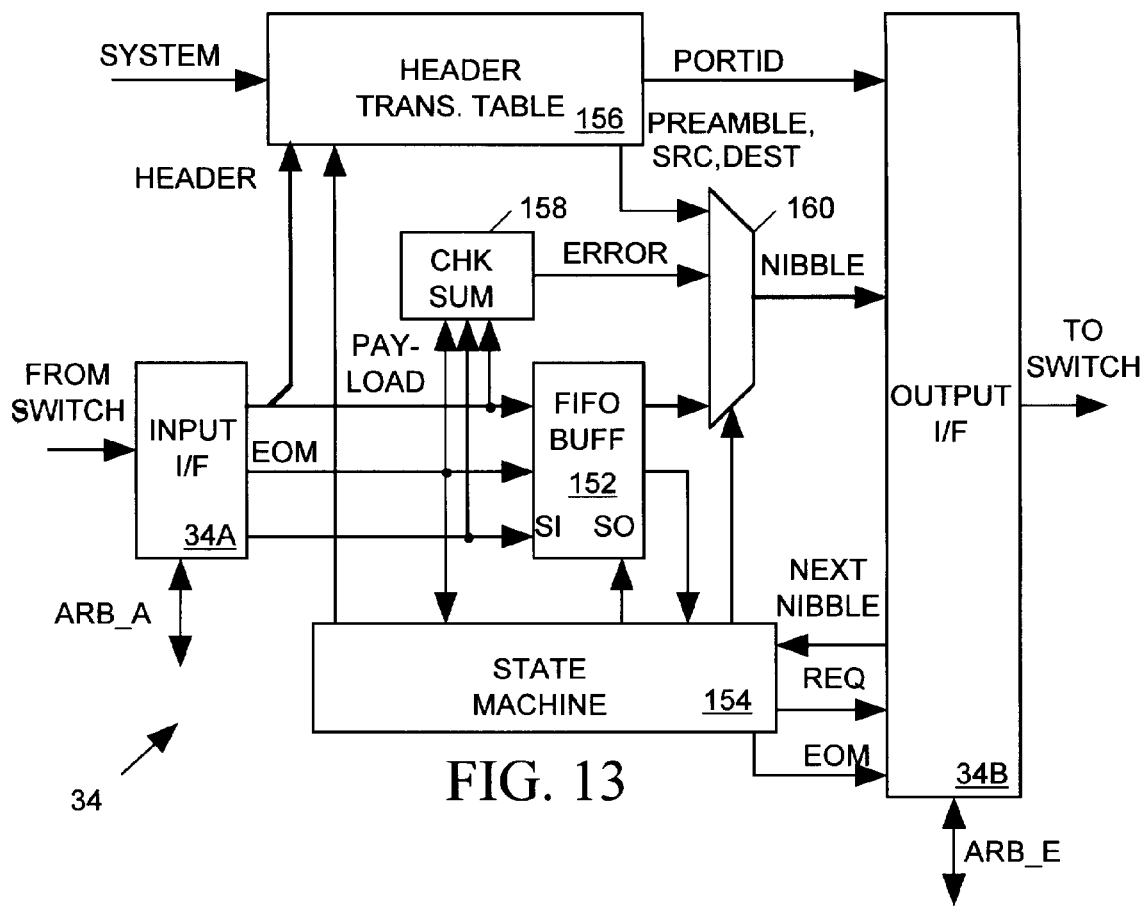
FIG. 13 illustrates the reassembly unit of FIG. 2 in more detailed block diagram form.

FIG. 13 illustrates reassembly unit 34 of FIG. 2 in more detailed block diagram form. Reassembly unit 34 includes an input interface 34A substantially similar to output port switch interface 70 of FIG. 8 for receiving a serialized, 4B5B encoded ATM cell from an ATM input port and converting it to an output sequence of bytes. Input interface 34A also handles ATM arbitration via the ARB_A bus in a manner similar to output port interface circuit 70. Reassembly unit 34 also includes an output interface circuit 34B, similar to Ethernet input port switch interface circuit 110 of FIG. 11, for receiving a sequence of 4-bit nibbles forming an Ethernet packet and forwarding them to an Ethernet output port in serialized, 4B5B encoded form. Output interface circuit 34B uses the ARB_E bus to arbitrate for access to Ethernet output ports in the same manner as interface circuit 110 of FIG. 11.

Input interface 34A sequentially shifts the payload portion of incoming ATM cells into a FIFO buffer 152 and also shifts in, along with each cell payload, an EOM bit indicating whether the incoming ATM cell is the last cell of ATM transmission. The header portion of the ATM cells is supplied to a header translation table 156 maintained by the host via the SYSTEM bus. Header translation table 156 converts the information in the header to preamble and source and destination address fields (SOURCE,DEST) of an Ethernet packet and also produces output PORTID data referencing the ID of a switch output port to receive the packet. As the cells are loaded into FIFO buffer 152 a check sum circuit 158 computes the ERROR field of the packet. When input interface circuit 34A pulses its output EOM signal, state machine 154 sends an output REQ signal to output interface circuit 34B. Thereafter output interface circuit 34B responds to a poll from arbiter 28 of FIG. 3 by sending the PORTID from header translation table 156 to the arbiter via the ARB_E bus and requesting a connection. When the arbiter grants the request, output interface circuit 34B begins sending NEXT NIBBLE signals to state machine 154 indicating when it requires a next nibble of the Ethernet packet to be forwarded. State machine 154 controls a multiplexer 160 which selects from among nibbles of the PREAMBLE, SOURCE and DEST field outputs of header translation table 156, the ERROR field output of check sum circuit 158, and the payload output of FIFO buffer 152. State machine 154 also signals FIFO buffer 152 to shift out payload data when needed. In response to a first set of NEXT NIBBLE signals, state machine 154 routes successive nibbles of the PREAMBLE, SOURCE and DEST fields to output interface circuit 34B. It then begins routing successive nibbles of the payload output of FIFO buffer 152 while successively shifting out cell payloads as necessary. After detecting an EOM bit emerging from FIFO buffer 152, state machine 154 routes successive nibbles of the ERROR field to output interface circuit 34B. State machine 154 then sends an EOM signal to output interface circuit 34B to indicate the end of the packet.

Segmentation Unit

Figure 14:
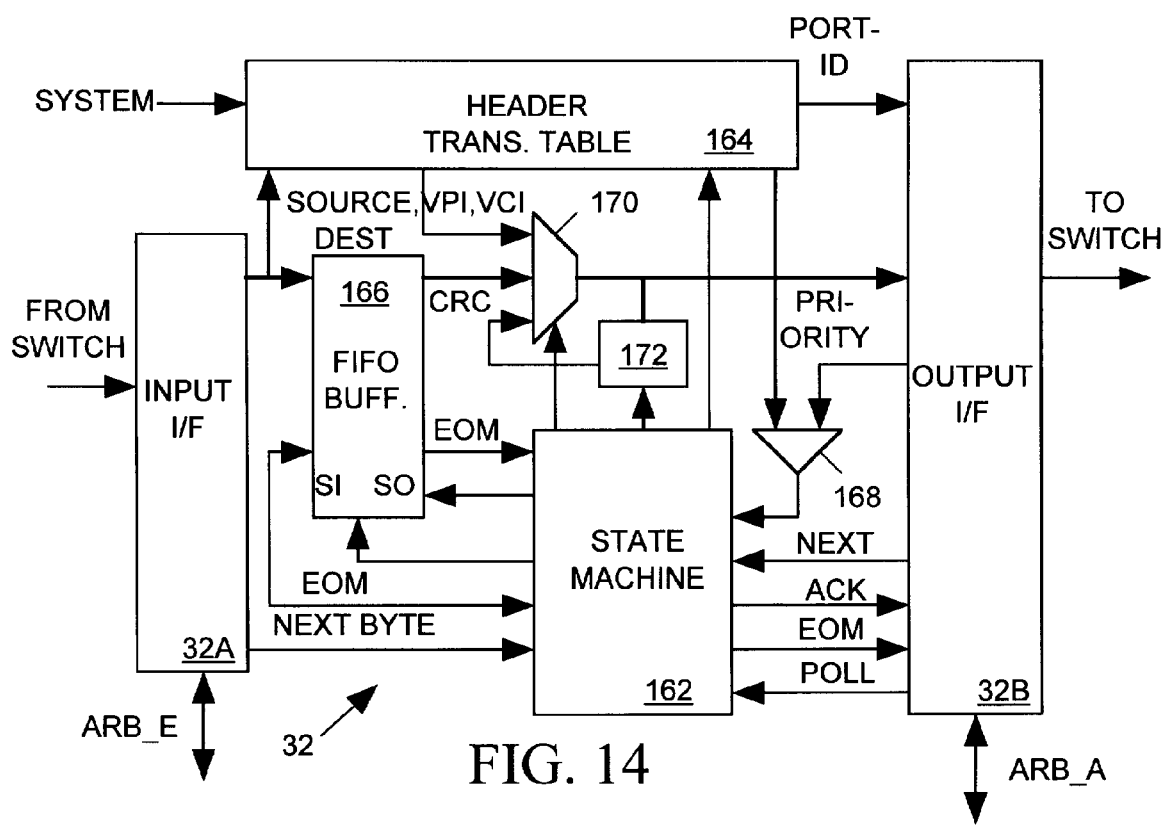
FIG. 14 illustrates the segmentation unit of FIG. 2 in more detailed block diagram form.

FIG. 14 illustrates segmentation unit 32 of FIG. 2 in more detailed block diagram form. Segmentation unit 32 includes an input interface 32A, substantially similar to output port switch interface 112 of FIG. 11, for receiving serialized, 4B5B encoded Ethernet packet from an Ethernet input port and converting it to an output sequence of bytes. Input interface 32A also handles Ethernet arbitration via the ARB_E bus in a manner similar to output port interface circuit 112 of FIG. 11. Segmentation unit 32 further includes an output interface circuit 32B similar to ATM input port switch interface circuit 62 of FIG. 8 for receiving a sequence of 4-bit nibbles forming ATM cells and forwarding them to an ATM output port in serialized, 4B5B encoded form. Output interface circuit 32B uses the ARB_A bus to arbitrate for access to ATM output ports in the same manner as interface circuit 62 of FIG. 8.

Input interface circuit 34A signals a state machine 162 when it outputs a next byte of an incoming Ethernet packet. The bytes forming the PREAMBLE, SOF, TYPE and ERROR fields of the packet are discarded. State machine 162 signals a header translation table 164 to acquire the bytes forming SOURCE and DEST fields, and shifts bytes forming the PAYLOAD field of each cell into a FIFO buffer 166. After receiving the SOURCE and DEST fields, header translation table 164, using information provided by the host via the SYSTEM bus, produces the PORTID of the destination ATM output port, the VPI and VCI fields for the ATM cells, and a PRIORITY code for the ATM transmission. Upon receiving an EOM bit output of input interface circuit 32A, state machine 162 shifts the EOM bit into FIFO buffer 166. Thereafter, when arbiter 28 of FIG. 3 polls output interface circuit 32B, interface circuit 32 forwards the priority code conveyed on the ARB_A line to a comparator 168 and asserts a POLL signal. Comparator 168 compares the code to the priority output of header translation table 164 and signals state machine 162 when they match. If state machine 162 has received an EOM bit from input interface 32A indicating that FIFO buffer 166 stores a complete Ethernet packet, state machine 162 sends an REQ signal to output interface 32B. Interface 32B then requests the arbiter to establish a connection to the ATM output port. When the connection is granted, output interface 32 sends a series of NEXT signal pulses to state machine 162. In response to each NEXT pulse, state machine 162 switches a multiplexer 170 to select a next nibble of a next ATM cell to be forwarded from among the output of FIFO buffer 166, the VPI and VCI outputs of header translation table 164 and the output of an error code generator circuit 172 which produces the cell's CRC field. State machine 162 shifts data out of FIFO buffer 166 to obtain data for the PAYLOAD fields for the ATM cells. After detecting an EOM bit emerging from FIFO buffer 166, state machine 162 sends the CRC output of error code generator 172 to output interface 32B and then forwards an EOM signal to interface 32B to signal the end of the ATM transmission.

Thus has been described a network switch that can route both ATM and Ethernet packets and which can translate between Ethernet and ATM protocol packets. Since the network switch translates between ATM and Ethernet protocols only when necessary, system throughput is enhanced. Also, since ATM transmissions are buffered at the input ports and fed to the reassembly unit on a per virtual channel basis without interleaving ATM cells, the reassembly unit need not sort out ATM transmissions and need not include extensive buffer memory for storing sorted ATM transmissions prior to reassembly into Ethernet packets.

While the forgoing specification has described preferred embodiment(s) of the present invention, one skilled in the art may make many modifications to the preferred embodiment without departing from the invention in its broader aspects. For example, while network switch is described as handling Ethernet and ATM protocol transmissions, those skilled in the art will understand that the basic architecture of the switch can be adapted to handle routing and conversion of other network protocols. The appended claims therefore are intended to cover all such modifications as fall within the true scope and spirit of the invention.

What is claimed is:

1. A network routing switch for receiving first protocol transmissions from external network devices, for converting first protocol transmissions to second protocol transmissions, and for forwarding received and converted first and second protocol transmissions to external network devices, the network switch comprising:

a plurality of first ports, each for receiving first protocol transmissions from an external network device and for forwarding first protocol transmissions to said external network device;

a plurality of second ports, each for forwarding second protocol transmissions to an external network device;

first conversion means for converting a first protocol transmission into a second protocol data transmission; and routing means for selectively interconnecting said first and second ports and said first conversion means for conveying transmissions therebetween;

wherein each first port receiving a first protocol transmission from an external network device stores the first protocol transmission and then sends the stored first protocol transmission through said routing means to another of said first ports when the first protocol transmission is to be forwarded to an external network device as a first protocol transmission, and sends a stored first protocol transmission through said routing means to said first conversion means when the stored first protocol transmission is to be converted to a second protocol transmission before being forwarded to an external network device, wherein the first conversion unit converts each first protocol transmission forwarded thereto into a second protocol transmission and sends the second protocol transmission through said routing means to one of said second ports to be forwarded thereby to an external network device, wherein each said first protocol transmission received by a first port comprises a plurality of sequentially transmitted cells, each cell including channel data referencing a virtual channel, wherein a last cell of each first protocol transmission includes an end of message code identifying said last cell as such, wherein at least one of said first ports receives cells of separate first protocol transmissions from external network sources in interleaved fashion, wherein each of said first ports stores cells of received first protocol data transmissions according to the virtual channel referenced by their virtual channel data, and wherein each of said first ports sends a stored first protocol transmission through said routing means only after receiving and storing said last cell of said first protocol transmission.

2. A network routing switch for receiving first protocol transmissions from external network devices, for converting first protocol transmissions to second protocol transmissions, and for forwarding received and converted first and second protocol transmissions to external network devices, the network switch comprising:

a plurality of first ports, each for receiving first protocol transmissions from an external network device and for forwarding first protocol transmissions to said external network device;

a plurality of second ports, each for forwarding second protocol transmissions to an external network device;

first conversion means for converting a first protocol transmission into a second protocol data transmission; and routing means for selectively interconnecting said first and second ports and said first conversion means for conveying transmissions therebetween;

wherein each first port receiving a first protocol transmission from an external network device stores the first protocol transmission and then sends the stored first protocol transmission through said routing means to another of said first ports when the first protocol transmission is to be forwarded to an external network device as a first protocol transmission, and sends a stored first protocol transmission through said routing means to said first conversion means when the stored first protocol transmission is to be converted to a second protocol transmission before being forwarded to an external network device, wherein the first conversion unit converts each first protocol transmission forwarded thereto into a second protocol transmission and sends the second protocol transmission through said routing means to one of said second ports to be forwarded thereby to an external network device, wherein each said first protocol transmission received by a first port comprises a plurality of sequentially transmitted cells, each cell including channel data referencing a virtual channel, and wherein each said first port includes means for determining, from the channel data included in the cells of each first protocol transmission received from an external network device, whether to send said first protocol transmission through said routing means to another of said first ports or to said first conversion means.

3. A network routing switch for receiving first protocol transmissions from external network devices, for converting first protocol transmissions to second protocol transmissions, and for forwarding received and converted first and second protocol transmissions to external network devices, the network switch comprising:

a plurality of first ports, each for receiving first protocol transmissions from an external network device and for forwarding first protocol transmissions to said external network device;

a plurality of second ports, each for forwarding second protocol transmissions to an external network device;

first conversion means for converting a first protocol transmission into a second protocol data transmission; and routing means for selectively interconnecting said first and second ports and said first conversion means for conveying transmissions therebetween;

wherein each first port receiving a first protocol transmission from an external network device stores the first protocol transmission and then sends the stored first protocol transmission through said routing means to another of said first ports when the first protocol transmission is to be forwarded to an external network device as a first protocol transmission, and sends a stored first protocol transmission through said routing means to said first conversion means when the stored first protocol transmission is to be converted to a second protocol transmission before being forwarded to an external network device, wherein the first conversion unit converts each first protocol transmission forwarded thereto into a second protocol transmission and sends the second protocol transmission through said routing means to one of said second ports to be forwarded thereby to an external network device, wherein each first protocol transmission includes a priority data value assigning a priority to said first protocol transmission, and wherein said routing means routes first protocol transmissions to any of said first ports and to said first conversion means with a priority determined by the priority data values included in the first protocol transmissions.

4. The network routing switch in accordance with claim 1 wherein each first protocol transmission includes a priority data value assigning a priority to said first protocol transmission, and wherein each of said first ports also stores cells of received first protocol transmissions according to the priority assigned to the transmission.

5. A network routing switch for receiving first protocol transmissions from external network devices, for converting first protocol transmissions to second protocol transmissions, and for forwarding received and converted first and second protocol transmissions to external network devices, the network switch comprising:

a plurality of first ports, each for receiving first protocol transmissions from an external network device and for forwarding first protocol transmissions to said external network device;

a plurality of second ports, each for forwarding second protocol transmissions to an external network device;

first conversion means for converting a first protocol transmission into a second protocol data transmission; and routing means for selectively interconnecting said first and second ports and said first conversion means for conveying transmissions therebetween, wherein each first port receiving a first protocol transmission from an external network device stores the first protocol transmission and then sends the stored first protocol transmission through said routing means to another of said first ports when the first protocol transmission is to be forwarded to an external network device as a first protocol transmission, and sends a stored first protocol transmission through said routing means to said first conversion means when the stored first protocol transmission is to be converted to a second protocol transmission before being forwarded to an external network device, wherein the first conversion unit converts each first protocol transmission forwarded thereto into a second protocol transmission and sends the second protocol transmission through said routing means to one of said second ports to be forwarded thereby to an external network device, wherein each said first protocol transmission received by a first port comprises a plurality of sequentially transmitted cells, each cell including channel data referencing a virtual channel, and wherein each second protocol transmission consists of a single packet, said packet including a data payload and a network destination address of a network device to receive the packet.

6. The network routing switch in accordance with claim 5 wherein each second port determines from the network destination address included in each packet received from an external network device whether to send said packet through said routing means to another of said second ports or to said second conversion means.

7. A network routing switch for receiving first protocol transmissions from external network devices, for converting first protocol transmissions to second protocol transmissions, and for forwarding received and converted first and second protocol transmissions to external network devices, the network switch comprising:

a plurality of first ports, each for receiving first protocol transmissions from an external network device and for forwarding first protocol transmissions to said external network device;

a plurality of second ports, each for forwarding second protocol transmissions to an external network device;

first conversion means for converting a first protocol transmission into a second protocol data transmission; and routing means for selectively interconnecting said first and second ports and said first conversion means for conveying transmissions therebetween;

wherein each first port receiving a first protocol transmission from an external network device stores the first protocol transmission and then sends the stored first protocol transmission through said routing means to another of said first ports when the first protocol transmission is to be forwarded to an external network device as a first protocol transmission, and sends a stored first protocol transmission through said routing means to said first conversion means when the stored first protocol transmission is to be converted to a second protocol transmission before being forwarded to an external network device, wherein the first conversion unit converts each first protocol transmission forwarded thereto into a second protocol transmission and sends the second protocol transmission through said routing means to one of said second ports to be forwarded thereby to an external network device, wherein each said first protocol transmission received by a first port comprises a plurality of sequentially transmitted cells, each cell including channel data referencing a virtual channel, wherein a last cell of each first protocol transmission includes an end of message code identifying said last cell as such, wherein at least one of said first ports receives cells of separate first protocol transmission from external network sources in interleaved fashion, wherein each of said first ports stores cells of received first protocol transmissions according to the virtual channel referenced by their virtual channel data, wherein each of said first ports sends a stored first protocol transmission through said routing means only after receiving and storing said last cell of said first protocol transmission, and wherein each said first port includes means for determining, from the channel data included in the cells of each first protocol transmission received from an external network device, whether to send said first protocol transmission through said routing means to another of said first ports or to said first conversion means.

8. The network routing switch in accordance with claim 7 wherein each first protocol transmission includes a priority data value assigning a priority to said first protocol data transmission, and wherein said routing means routes first protocol transmissions to any of said first ports and to said first conversion means with a priority determined by the priority data values included in the first protocol transmissions.

9. The network routing switch in accordance with claim 8 wherein each of said first ports also stores cells of received first protocol transmissions according to the priority assigned thereto.

10. The network routing switch in accordance with claim 9 wherein each said second protocol transmissions consists of a single packet, said packet including a data payload and a network destination address of a network device to receive the packet.

11. A network routing switch for receiving differing first and second protocol transmissions from external network devices, for converting first protocol transmissions to second protocol transmissions, for converting second protocol transmissions into first protocol transmissions, and for forwarding received and converted first and second protocol transmissions to external network devices, the network switch comprising:

a set of first ports, each for receiving first protocol transmissions from an external network device and for forwarding first protocol transmissions to said external network device;

a set of second ports, each for receiving second protocol transmissions from an external device and for forwarding second protocol transmissions to said external network device;

first conversion means for converting a first protocol transmission into a second protocol data transmission;

second conversion means for converting a second protocol transmission into a first protocol transmission; and routing means for selectively interconnecting said first and second ports and said first and second conversion means for conveying transmissions therebetween, wherein each first port receiving a first protocol transmission from an external network device stores the first protocol transmission and then sends the stored first protocol transmission through said routing means to another of said first ports when the first protocol transmission is to be forwarded to an external network device as a first protocol transmission, and sends a stored first protocol transmission through said routing means to said first conversion means when the stored first protocol transmission is to be converted to a second protocol transmission before being forwarded to an external network device, wherein each second port receiving a second protocol transmission from an external network device stores the second protocol transmission until it is complete and then sends the stored second protocol transmission through said routing means to another of said second ports when the second protocol transmission is to be forward to an external network device as a second protocol transmission, and sends the stored second protocol transmission through said routing means to said second conversion means when the stored second protocol transmission is to be converted to a first protocol transmission before being forwarded to an external network device, wherein the first conversion unit converts each first protocol transmission forwarded thereto into a second protocol transmission and sends the second protocol transmission through said routing means to one of said second ports to be forwarded thereby to an external network device, wherein the second conversion unit converts each second protocol transmission forwarded thereto into a first protocol transmission and sends the first protocol transmission through said routing means to one of said first ports to be forwarded thereby to an external network device, wherein each said first protocol transmission received by a first port comprises a plurality of sequentially transmitted cells, each cell including channel data referencing a virtual channel, wherein a last cell of each first protocol transmission includes an end of message code identifying said last cell as such, wherein at least one of said first ports receives cells of separate first protocol transmission from external network sources in interleaved fashion, wherein each of said first ports stores cells of received first protocol transmissions according to the virtual channel referenced by their virtual channel data, and wherein each of said first ports sends a stored first protocol data transmission through said routing means only after receiving and storing said last cell of said first protocol data transmission.

12. A network routing switch for receiving differing first and second protocol transmissions from external network devices, for converting first protocol transmissions to second protocol transmissions, for converting second protocol transmissions into first protocol transmissions, and for forwarding received and converted first and second protocol transmissions to external network devices, the network switch comprising:

a set of first ports, each for receiving first protocol transmissions from an external network device and for forwarding first protocol transmissions to said external network device;

a set of second ports, each for receiving second protocol transmissions from an external device and for forwarding second protocol transmissions to said external network device;

first conversion means for converting a first protocol transmission into a second protocol data transmission; and second conversion means for converting a second protocol transmission into a first protocol transmission;

routing means for selectively interconnecting said first and second ports and said first and second conversion means for conveying transmissions therebetween;

wherein each first port receiving a first protocol transmission from an external network device stores the first protocol transmission and then sends the stored first protocol transmission through said routing means to another of said first ports when the first protocol transmission is to be forwarded to an external network device as a first protocol transmission, and sends a stored first protocol transmission through said routing means to said first conversion means when the stored first protocol transmission is to be converted to a second protocol transmission before being forwarded to an external network device, wherein each second port receiving a second protocol transmission from an external network device stores the second protocol transmission until it is complete and then sends the stored second protocol transmission through said routing means to another of said second ports when the second protocol transmission is to be forward to an external network device as a second protocol transmission, and sends the stored second protocol transmission through said routing means to said second conversion means when the stored second protocol transmission is to be converted to a first protocol transmission before being forwarded to an external network device, wherein the first conversion unit converts each first protocol transmission forwarded thereto into a second protocol transmission and sends the second protocol transmission through said routing means to one of said second ports to be forwarded thereby to an external network device, wherein the second conversion unit converts each second protocol transmission forwarded thereto into a first protocol transmission and sends the first protocol transmission through said routing means to one of said first ports to be forwarded thereby to an external network device, wherein each said first protocol transmission received by a first port comprises a plurality of sequentially transmitted cells, each cell including channel data referencing a virtual channel, and wherein each said first port includes means for determining, from the channel data included in the cells of each first protocol transmission received from an external network device, whether to send said first protocol transmission through said routing means to another of said first ports or to said first conversion means.

13. A network routing switch for receiving differing first and second protocol transmissions from external network devices, for converting first protocol transmissions to second protocol transmissions, for converting second protocol transmissions into first protocol transmissions, and for forwarding received and converted first and second protocol transmissions to external network devices, the network switch comprising:

a set of first ports, each for receiving first protocol transmissions from an external network device and for forwarding first protocol transmissions to said external network device;

a set of second ports, each for receiving second protocol transmissions from an external device and for forwarding second protocol transmissions to said external network device;

first conversion means for converting a first protocol transmission into a second protocol data transmission;

second conversion means for converting a second protocol transmission into a first protocol transmission; and routing means for selectively interconnecting said first and second ports and said first and second conversion means for conveying transmissions therebetween;

wherein each first port receiving a first protocol transmission from an external network device stores the first protocol transmission and then sends the stored first protocol transmission through said routing means to another of said first ports when the first protocol transmission is to be forwarded to an external network device as a first protocol transmission, and sends a stored first protocol transmission through said routing means to said first conversion means when the stored first protocol transmission is to be converted to a second protocol transmission before being forwarded to an external network device, wherein each second port receiving a second protocol transmission from an external network device stores the second protocol transmission until it is complete and then sends the stored second protocol transmission through said routing means to another of said second ports when the second protocol transmission is to be forward to an external network device as a second protocol transmission, and sends the stored second protocol transmission through said routing means to said second conversion means when the stored second protocol transmission is to be converted to a first protocol transmission before being forwarded to an external network device, wherein the first conversion unit converts each first protocol transmission forwarded thereto into a second protocol transmission and sends the second protocol transmission through said routing means to one of said second ports to be forwarded thereby to an external network device, wherein the second conversion unit converts each second protocol transmission forwarded thereto into a first protocol transmission and sends the first protocol transmission through said routing means to one of said first ports to be forwarded thereby to an external network device, wherein each first protocol transmission includes a priority data value assigning a priority to said first protocol transmission, and wherein said routing means routes first protocol transmissions to any of said first ports and to said first conversion means with a priority determined by the priority data values included in the first protocol transmissions.

14. The network routing switch in accordance with claim 11 wherein each first protocol transmission includes a priority data value assigning a priority to said first protocol transmission, and wherein each of said first ports also stores cells of received first protocol transmissions according to the priority assigned to the transmission.

15. A network routing switch for receiving differing first and second protocol transmissions from external network devices, for converting first protocol transmissions to second protocol transmissions, for converting second protocol transmissions into first protocol transmissions, and for forwarding received and converted first and second protocol transmissions to external network devices, the network switch comprising:

a set of first ports, each for receiving first protocol transmissions from an external network device and for forwarding first protocol transmissions to said external network device;

a set of second ports, each for receiving second protocol transmissions from an external device and for forwarding second protocol transmissions to said external network device;

first conversion means for converting a first protocol transmission into a second protocol data transmission;

second conversion means for converting a second protocol transmission into a first protocol transmission; and routing means for selectively interconnecting said first and second ports and said first and second conversion means for conveying transmissions therebetween;

wherein each first port receiving a first protocol transmission from an external network device stores the first protocol transmission and then sends the stored first protocol transmission through said routing means to another of said first ports when the first protocol transmission is to be forwarded to an external network device as a first protocol transmission, and sends a stored first protocol transmission through said routing means to said first conversion means when the stored first protocol transmission is to be converted to a second protocol transmission before being forwarded to an external network device, wherein each second port receiving a second protocol transmission from an external network device stores the second protocol transmission until it is complete and then sends the stored second protocol transmission through said routing means to another of said second ports when the second protocol transmission is to be forward to an external network device as a second protocol transmission, and sends the stored second protocol transmission through said routing means to said second conversion means when the stored second protocol transmission is to be converted to a first protocol transmission before being forwarded to an external network device, wherein the first conversion unit converts each first protocol transmission forwarded thereto into a second protocol transmission and sends the second protocol transmission through said routing means to one of said second ports to be forwarded thereby to an external network device, wherein the second conversion unit converts each second protocol transmission forwarded thereto into a first protocol transmission and sends the first protocol transmission through said routing means to one of said first ports to be forwarded thereby to an external network device, wherein each said first protocol transmission received by a first port comprises a plurality of sequentially transmitted cells, each cell including channel data referencing a virtual channel, and wherein each said second protocol transmissions consists of a single packet, said packet including a data payload and a network destination address of a network device to receive the packet.

16. The network routing switch in accordance with claim 15 wherein each second port determines from the network destination address included in each packet received from an external network device whether to send said packet through said routing means to another of said second ports or to said second conversion means.

17. A network routing switch for receiving differing first and second protocol transmissions from external network devices, for converting first protocol transmissions to second protocol transmissions, for converting second protocol transmissions into first protocol transmissions, and for forwarding received and converted first and second protocol transmissions to external network devices, the network switch comprising:

a set of first ports, each for receiving first protocol transmissions from an external network device and for forwarding first protocol transmissions to said external network device;

a set of second ports, each for receiving second protocol transmissions from an external device and for forwarding second protocol transmissions to said external network device;

first conversion means for converting a first protocol transmission into a second protocol data transmission;

second conversion means for converting a second protocol transmission into a first protocol transmission; and routing means for selectively interconnecting said first and second ports and said first and second conversion means for conveying transmissions therebetween;

wherein each first port receiving a first protocol transmission from an external network device stores the first protocol transmission and then sends the stored first protocol transmission through said routing means to another of said first ports when the first protocol transmission is to be forwarded to an external network device as a first protocol transmission, and sends a stored first protocol transmission through said routing means to said first conversion means when the stored first protocol transmission is to be converted to a second protocol transmission before being forwarded to an external network device, wherein each second port receiving a second protocol transmission from an external network device stores the second protocol transmission until it is complete and then sends the stored second protocol transmission through said routing means to another of said second ports when the second protocol transmission is to be forward to an external network device as a second protocol transmission, and sends the stored second protocol transmission through said routing means to said second conversion means when the stored second protocol transmission is to be converted to a first protocol transmission before being forwarded to an external network device, wherein the first conversion unit converts each first protocol transmission forwarded thereto into a second protocol transmission and sends the second protocol transmission through said routing means to one of said second ports to be forwarded thereby to an external network device, wherein the second conversion unit converts each second protocol transmission forwarded thereto into a first protocol transmission and sends the first protocol transmission through said routing means to one of said first ports to be forwarded thereby to an external network device, wherein each said first protocol transmission received by a first port comprises a plurality of sequentially transmitted cells, each cell including channel data referencing a virtual channel, wherein a last cell of each first protocol transmission includes an end of message code identifying said last cell as such, wherein at least one of said first ports receives cells of separate first protocol transmission from external network sources in interleaved fashion, wherein each of said first ports stores cells of received first protocol transmissions according to the virtual channel referenced by their virtual channel data, wherein each of said first ports send a stored first protocol transmission through said routing means only after receiving and storing said last cell of said first protocol transmission, and wherein each said first port includes means for determining, from the channel data included in the cells of each first protocol transmission received from an external network device, whether to send said first protocol transmission through said routing means to another of d first ports or to said first conversion means.

18. The network routing switch in accordance with claim 17 wherein each first protocol transmission includes a priority data value assigning a priority to said first protocol transmission, and wherein said routing means routes first protocol transmissions to said first ports and said first conversion means in order of priority indicated by the priority data values included in the first protocol transmissions.

19. The network routing switch in accordance with claim 18 wherein each of said first ports also stores cells of received first protocol transmissions in groups linked according to the priority assigned to the transmission.

20. The network routing switch in accordance with claim 19 wherein each said second protocol transmission consists of a single packet, said packet including a data payload and a network destination address of a network device to receive the packet.

21. The network routing switch in accordance with claim 20 wherein each second port determines from the network destination address included in each packet received from an external network device whether to route said packet through said routing means to another of said second ports or to said second conversion means.

* * * * *